(12) United States Patent
Suga

(10) Patent No.: US 7,535,603 B2
(45) Date of Patent: May 19, 2009

(54) IMAGE READING APPARATUS AND IMAGE READING SYSTEM

(75) Inventor: Junya Suga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 11/820,905

(22) Filed: Jun. 21, 2007

(65) Prior Publication Data
US 2008/0002240 A1    Jan. 3, 2008

(30) Foreign Application Priority Data
Jun. 21, 2006    (JP) ............................. 2006-171385

(51) Int. Cl.
*H04N 1/04* (2006.01)
(52) U.S. Cl. ...................... 358/474; 358/512; 358/513; 358/514; 358/505
(58) Field of Classification Search ................ 358/518, 358/474, 512, 513, 514; 250/208.1
See application file for complete search history.

(56) References Cited

U.S. PATENT DOCUMENTS

| | | | | |
|---|---|---|---|---|
| 4,809,041 A | * | 2/1989 | Funada | 399/82 |
| 4,914,524 A | * | 4/1990 | Kimura | 358/462 |
| 2005/0207793 A1 | * | 9/2005 | Ikeda et al. | 399/254 |
| 2006/0176527 A1 | * | 8/2006 | Kato et al. | 358/505 |
| 2007/0035782 A1 | * | 2/2007 | Mitani | 358/448 |
| 2007/0127962 A1 | * | 6/2007 | Fukumura | 399/367 |
| 2007/0146822 A1 | * | 6/2007 | OYAMA | 358/488 |
| 2007/0170898 A1 | * | 7/2007 | Ogawa | 323/234 |
| 2007/0214363 A1 | * | 9/2007 | Ishii | 713/178 |
| 2007/0215788 A1 | * | 9/2007 | Nishihara et al. | 250/205 |
| 2008/0232842 A1 | * | 9/2008 | Honma | 399/81 |
| 2008/0309960 A1 | * | 12/2008 | KINOSHITA | 358/1.13 |

FOREIGN PATENT DOCUMENTS

JP    11-055471    2/1999

* cited by examiner

*Primary Examiner*—Twyler L Haskins
*Assistant Examiner*—David L Suazo
(74) *Attorney, Agent, or Firm*—Edwards Angell Palmer & Dodge LLP; John J. Penny, Jr.

(57) ABSTRACT

The invention provides an image reading apparatus that scans an image from an original document including: a light source that irradiates a light to the original document; a photoelectric conversion element; a driving mechanism that relatively moves either one of the photoelectric conversion element or the original document in a predetermined direction with respect to the other; a detection sensor that detects a vector amount of movement of either one of the photoelectric conversion element or the original document in the predetermined direction with respect to the other so as to output a detection signal for each vector amount of movement that corresponds to a minimum unit of a reading area of the image; and a control unit that executes one cycle of operations each time when the detection signal is outputted from the detection sensor.

15 Claims, 19 Drawing Sheets

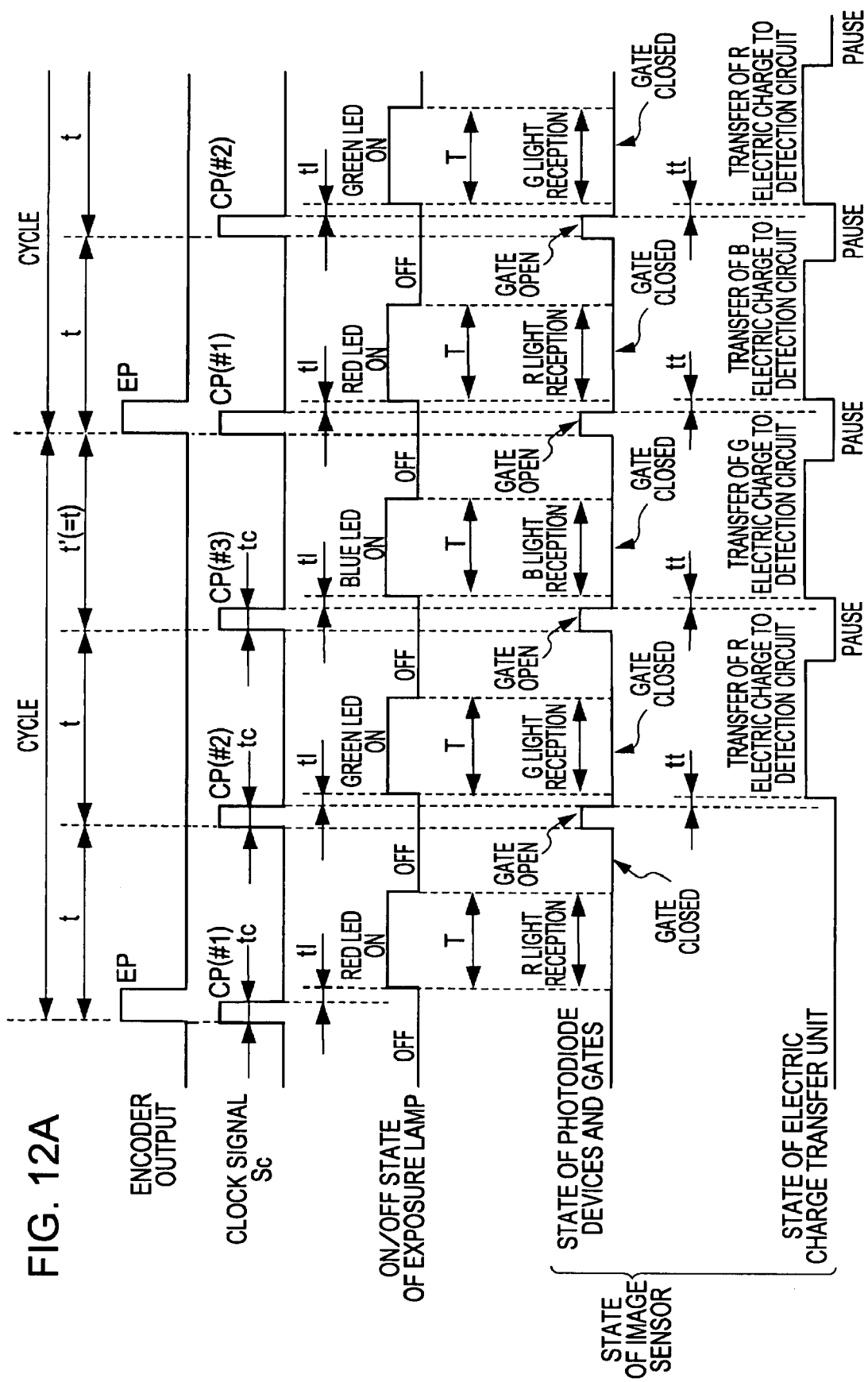

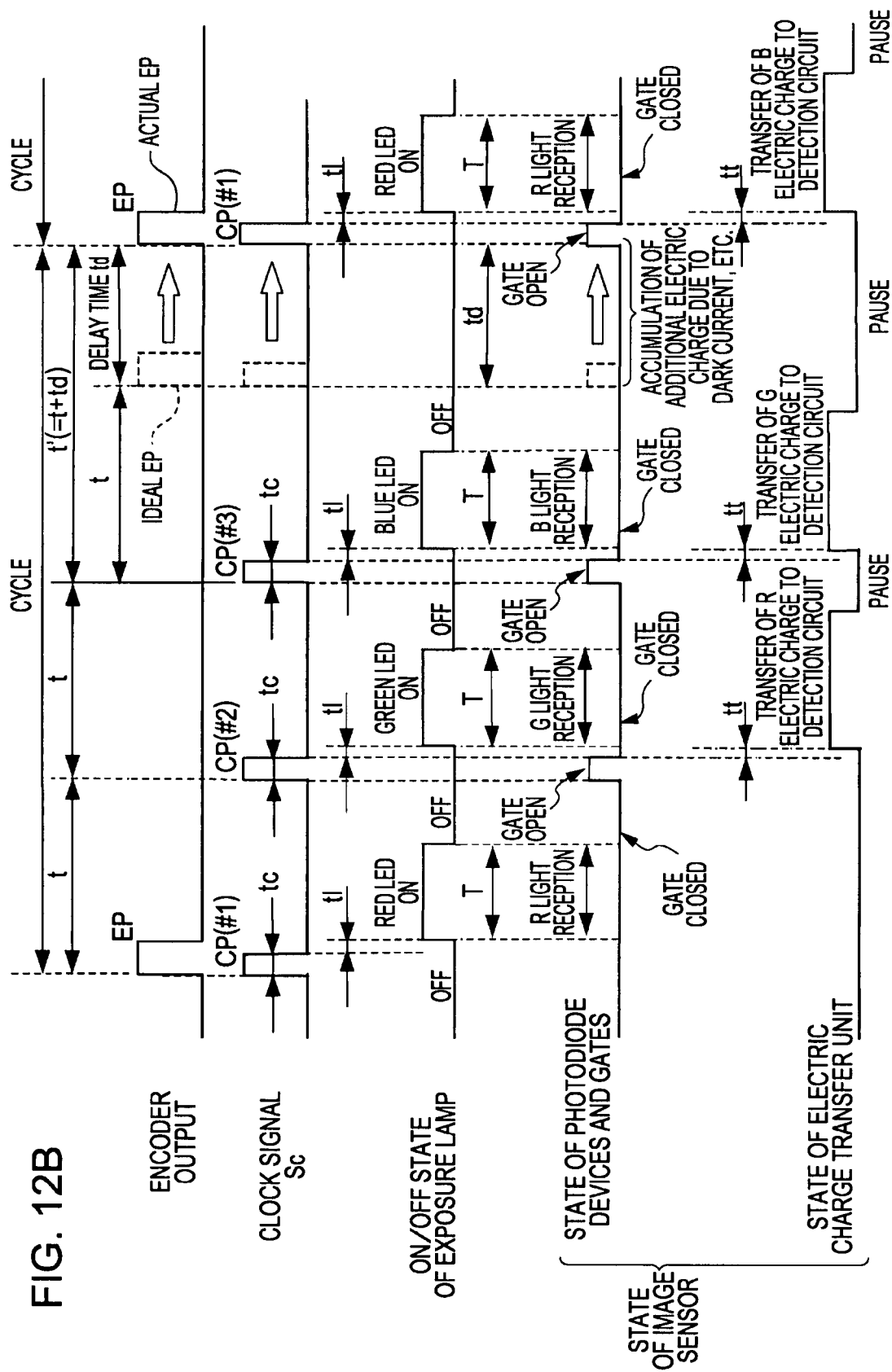

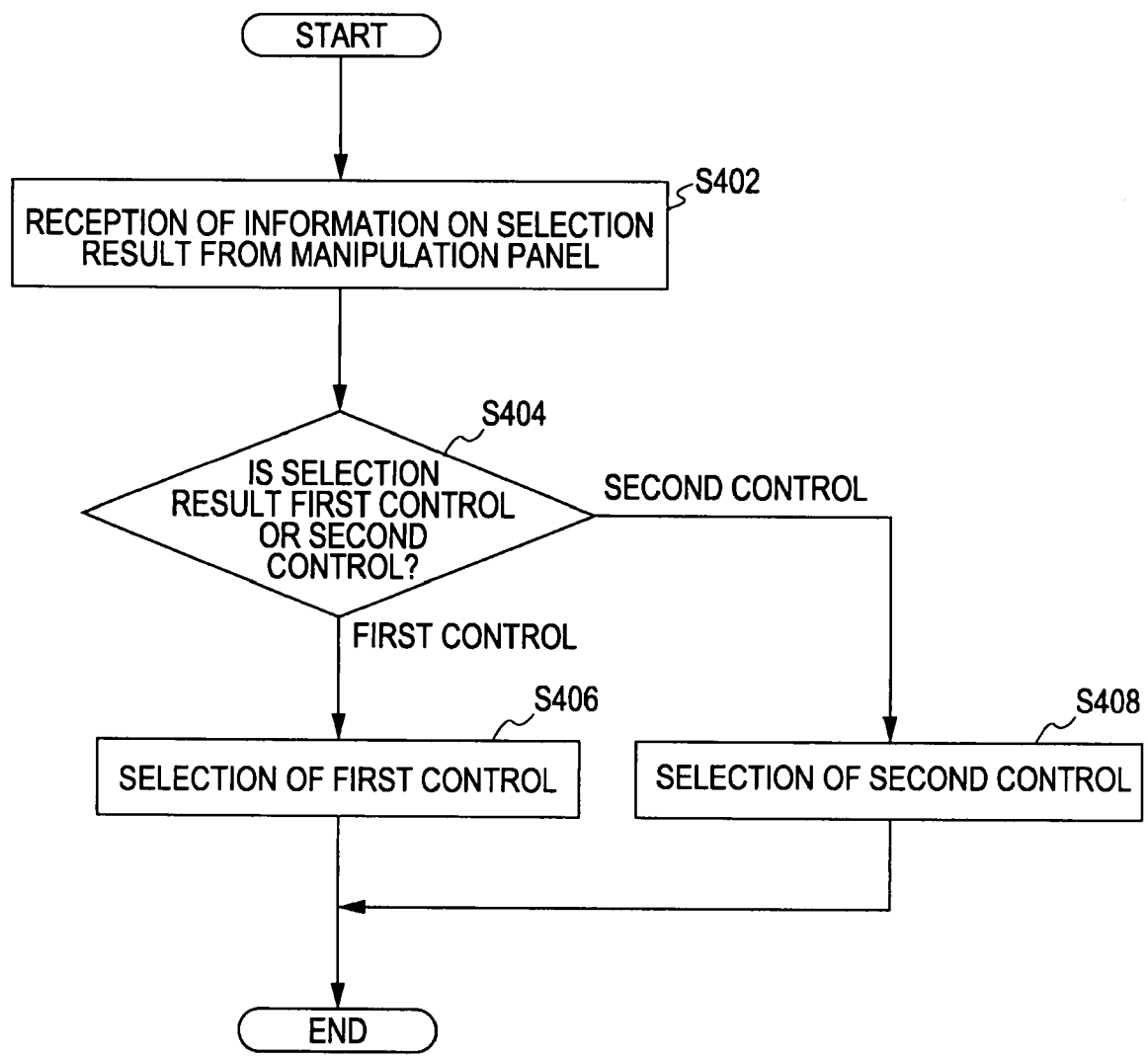

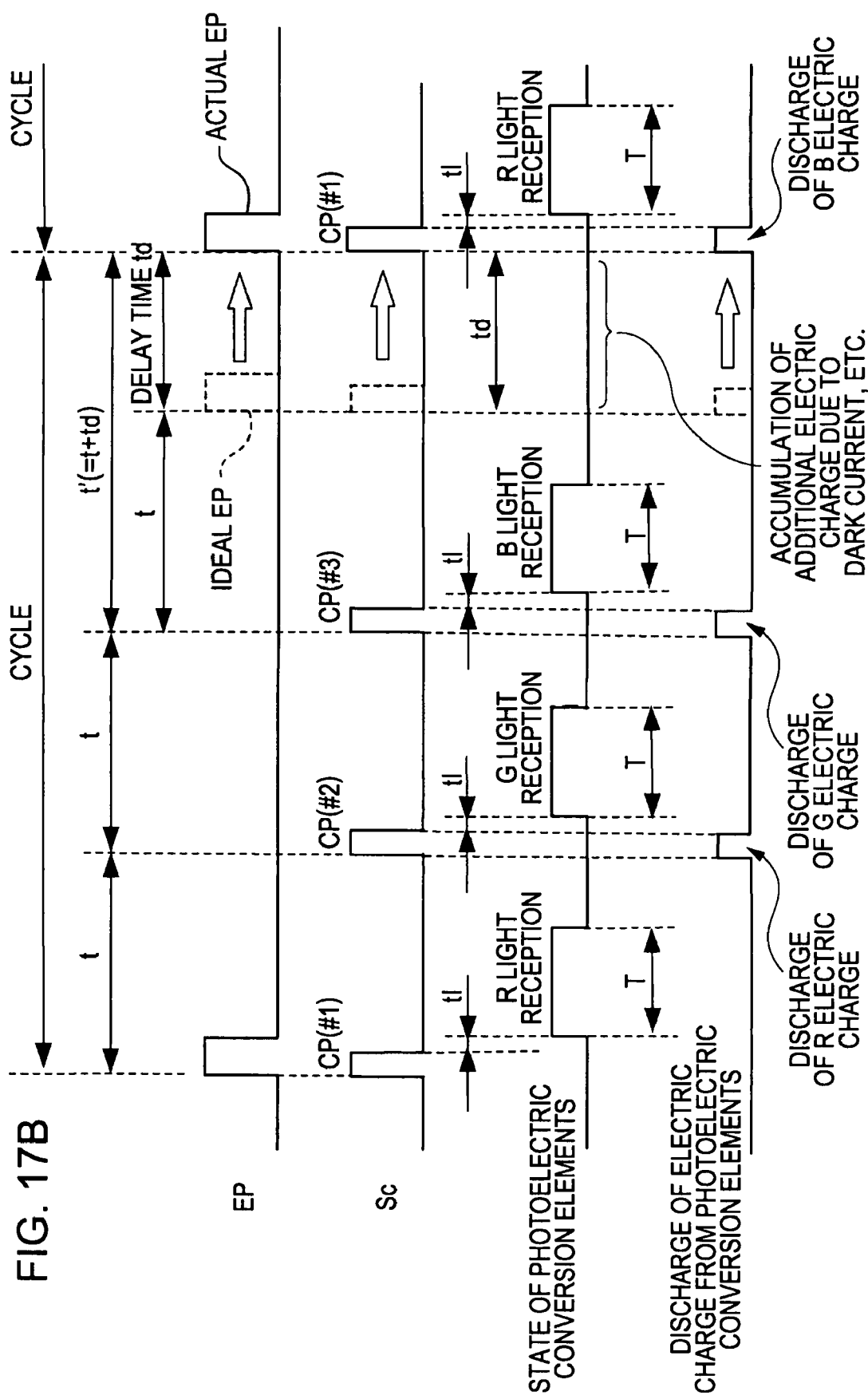

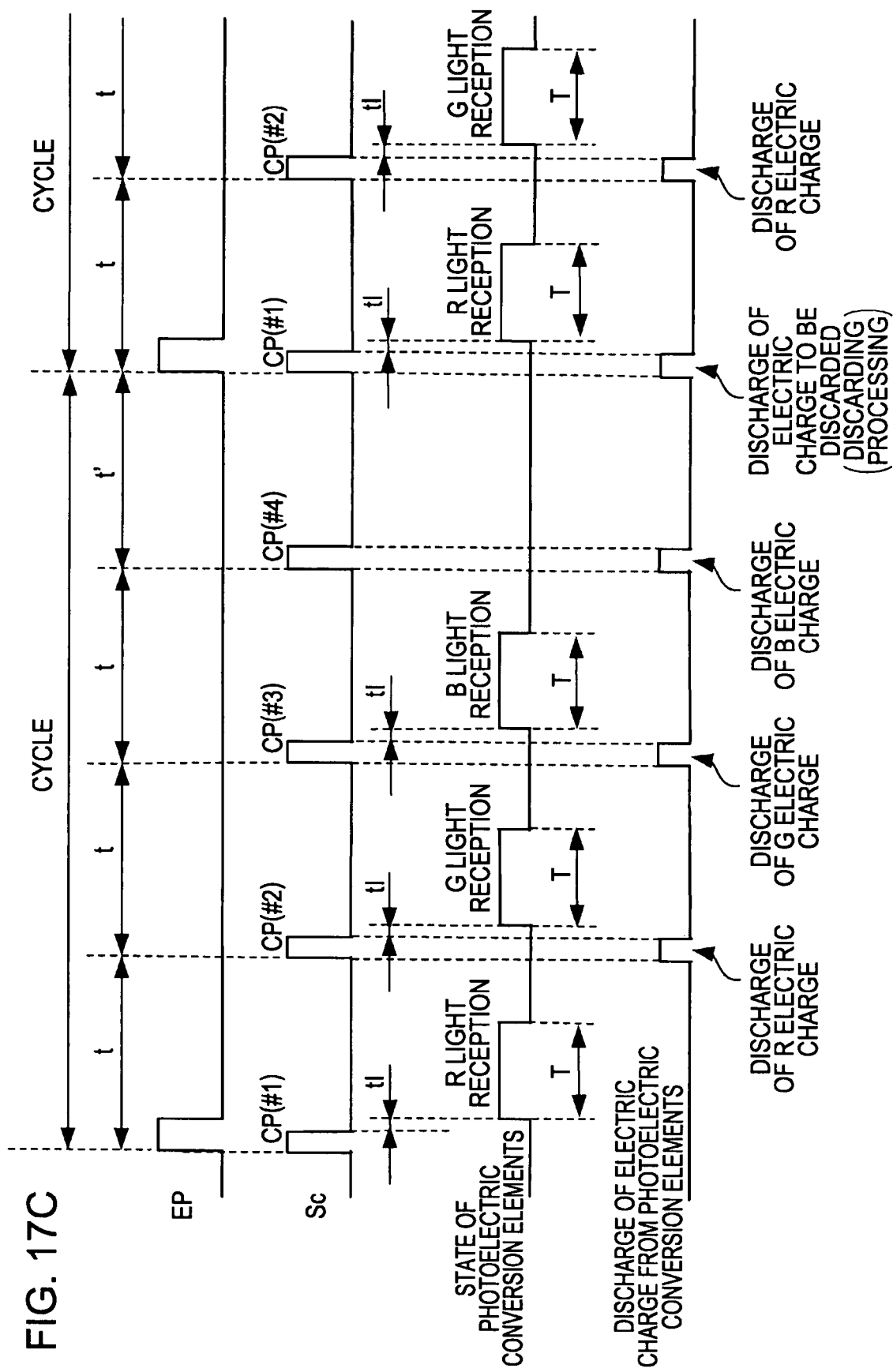

IMAGE READING APPARATUS AND IMAGE READING SYSTEM

CROSS REFERENCES TO RELATED APPLICATIONS

Applicant hereby claims priority to Japanese Patent Application No. 2006-171385, filed Jun. 21, 2006, which is expressly incorporated by reference herein.

BACKGROUND

1. Technical Field

The present invention relates to an image reading apparatus and an image reading system for reading an image from an original document.

2. Related Art

An image reading apparatus that scans an image from an original document is well-known in the prior art. Such an image reading apparatus is provided with (a) photoelectric conversion elements (i.e. photoelectric transducers) that receive a light reflected from or transmitted through an original document so as to accumulate electric charge, the amount of which depends on the amount of the light received, while the photoelectric conversion elements move in a predetermined direction with respect to the original document, and (b) an encoder that detects the vector amount of the movement in the predetermined direction so as to output a detection signal for each relative motion vector amount that corresponds to the size of a pixel that is to be scanned.

In such a configuration, one cycle of operation includes a light reception operation, in which the photoelectric conversion element receives a light coming from the original document in a predetermined color order (for example, in the order of R (red), G (green), B (Blue)) for a predetermined light reception time duration where the light reception operation is executed once for each color component, and an electric charge takeout operation, in which electric charge is taken out of the photoelectric conversion element after each light reception operation executed for the light reception time duration (hereafter referred to as electric charge discharge operation). According to such a configuration, image scanning is executed by repeating the cycle of operations at each time when the detection signal is outputted from the encoder (for example, refer to JP-A-11-55471).

In some of the image reading apparatuses, the above-described light reception operation and the electric charge discharge operation are carried out based on a detection signal EP, which is outputted from the encoder, and the clock pulses CP, which are outputted at intervals of a predetermined time t using the detection signal EP as a starting point thereof (this operation is hereafter referred to as a second control).

FIG. 17A is an explanatory diagram that schematically illustrates an example of the operation timing of the light reception operation and the electric charge discharge operation when the second control is adopted. As illustrated in FIG. 17A, three of clock pulses, that is, a first clock pulse CP (#1), a second clock pulse CP (#2), and a third clock pulse CP (#3), are outputted for each cycle at the interval of a predetermined time "t" using the output of the detection signal EP from the encoder as a starting point thereof. More specifically, the first clock pulse CP (#1) is outputted in synchronization with the start of the detection signal EP; the second clock pulse CP (#2) is outputted after a lapse of the predetermined time t after the output of the first clock pulse CP (#1); and the third clock pulse CP (#3) is outputted after a lapse of the predetermined time t after the output of the second clock pulse CP (#2). It should be noted that in the figure, the time interval between the third clock pulse CP (#3) in a certain cycle and the first clock pulse CP (#1) in the next cycle is denoted as t' rather than t because the output timing of the first clock pulse CP (#1) is subjected to variation depending on a possible delay in the output of the detection signal EP. In other words, if it is assumed that there is not any delay in the outputting of the detection signal EP, which is an ideal condition, the above time interval t' is equal to the predetermined time t, where the figure illustrates such an ideal condition.

According to the second control, triggered by the above-described first clock pulse CP (#1), which is outputted at the timing of the detection signal EP outputted from the encoder, the light reception operation is performed for the first color component among color components R, G, and B (for example, R color component). Through the light reception operation, electric charge is accumulated in the photoelectric conversion elements, where the amount of the electric charge accumulated therein depends on the amount of the light received during a light reception time duration T. Then, the accumulated electric charge is taken out of the photoelectric conversion elements as the electric charge of the first color component at the timing of the second clock pulse CP (#2).

Triggered by the second clock pulse (#2), the light reception operation for the second color component (for example, G color component) is performed so that electric charge is accumulated in the photoelectric conversion elements, where the amount of the electric charge accumulated therein depends on the amount of the light received during the light reception time duration T. Then, the accumulated electric charge is taken out of the photoelectric conversion elements as the electric charge of the second color component at the timing of the third clock pulse CP (#3).

Triggered by the third clock pulse (#3), the light reception operation for the third color component (for example, B color component) is performed so that electric charge is accumulated in the photoelectric conversion elements, where the amount of the electric charge accumulated therein approximately depends on the amount of the light received during the light reception time duration T. Then, the accumulated electric charge is taken out of the photoelectric conversion elements as the electric charge of the third color component at the timing of the first clock pulse CP (#1), which is outputted at the timing of the next detection signal EP outputted from the encoder. In this way, electric charge for each of the color components R, G, and B is taken out, which means that the scanning of an image that constitutes one pixel is completed in the predetermined direction.

However, according to the second control described above, there is a problem in that the amount of electric charge actually accumulated for the third color component (for example, the Blue color component) tends to be larger than the amount of electric charge that is supposed to be accumulated for this color component during the light reception time duration T described above, which could cause degradation in the quality of the scanned image.

The reason why such a problem occurs is that, when there is some variation (i.e. scatter, dispersion) in the movement speed in the predetermined direction, as illustrated in FIG. 17B, the time interval from the end of the light reception time duration T for the third color component (e.g. B component) till the outputting of the detection signal EP from the encoder is made longer than the ideal condition illustrated in FIG. 17A because of such a variation by the length of a delay time td. In other words, the electric charge could still be accumulated in the photoelectric conversion elements due to the presence of a dark current, etc., even though no light reception operation is performed after the end of the light reception time duration T; and if such a phenomenon occurs so that the timing of the detection signal outputted from the encoder is delayed by the delay time td, electric charge accumulated for the third color component (e.g. B component) could contain any unwanted additional electric charge, making the accumulated amount of the electric charge thereof larger than the amount of electric charge that is supposed to be accumulated for this color component. Such an additional electric charge accumulated for the third color component (e.g. B component) has a direct and adverse effect on the precision of image data generated based on the accumulated electric charge, which results in degradation in the quality of the scanned image.

As a first control for preventing image quality from being degraded, the following configuration could be adopted. FIG. 17C is an explanatory diagram that schematically illustrates an example of the operation timing of the light reception operation and the electric charge discharge operation when the first control is adopted. Herein, the major difference between the first control and the second control lies in that, in contrast to the second control where three of clock pulses are outputted for each output of the detection signal EP from the encoder, four clock pulses, that is, the first clock pulse CP (#1), the second clock pulse CP (#2), the third clock pulse CP (#3), and the fourth clock pulse CP (#4), are outputted in the first control, and in addition thereto, a discarding processing is performed in the first control so as to discard any unwanted additional electric charge accumulated due to the presence of a dark current after the electric charge discharge operation for the third color component (e.g. B component) that is performed at the timing of the fourth clock pulse CP (#4).

More specifically, as illustrated in FIG. 17C, in the same manner as the second control, the first control works as follows: the light reception operation for the first color component (e.g. R component) is performed based on the first clock pulse CP (#1); the electric charge discharge operation for the first color component as well as the light reception operation for the second color component (e.g. G component) is performed based on the second clock pulse CP (#2); and the electric charge discharge operation for the second color component as well as the light reception operation for the third color component (e.g. B component) is performed based on the third clock pulse CP (#3). After receiving the light of the third color component for the light reception time duration, the photoelectric conversion elements hold electric charge accumulated therein, the amount of which depends on the amount of the light received during the light reception time duration.

However, in the second control, the electric charge accumulated for the third color component (e.g. B component) is not taken out of the photoelectric conversion elements at the timing of the next detection signal EP outputted from the encoder as in the first control, but based on the fourth clock pulse CP (#4).

In the second control, the electric charge to be discarded is taken out of the photoelectric conversion elements at the output timing of the next detection signal EP. That is, in the second control, any unwanted additional electric charge accumulated due to the presence of a dark current after the electric charge discharge operation for the third color component but before the outputting of the next detection signal EP is discarded through the electric discharge operation executed at the output timing of the next detection signal EP. Therefore, even if there occurs a delay in the output of the detection signal EP, which poses a problem in the second control, it is possible to avoid or reduce degradation in the image quality due to any unwanted additional electric charge, which is achieved by the discarding processing described above.

However, the first control has a disadvantage in that its scanning speed is slower than that of the second control because the former takes extra time for the discarding of electric charge. That is, as a comparison between FIG. 17A and FIG. 17C shows clearly, the first control illustrated in FIG. 17C requires extra time for scanning than the second control illustrated in FIG. 17A does by the length of an additional predetermined time t taken for generation of the fourth clock pulse CP (#4). In addition, depending on requirements of each situation, the user can change his preference as to which one of the reading speed and the image quality should be given a higher priority. Accordingly, the user-friendliness is enhanced because the user is allowed to select between the first control and the second control depending on the requirements of each situation.

SUMMARY

An advantage of some aspects of the invention is to provide a user-friendly image reading apparatus that allows the user to select between quality-oriented scanning in which a higher priority is given to the quality of an image and speed-oriented scanning in which a higher priority is given to the processing speed of a scanning job.

In one aspect of the invention, an image reading apparatus is provided that scans an image from an original document, where the image reading apparatus includes: a light source that irradiates a light to the original document; a photoelectric conversion element that selectively receives a red color component, a green color component, and a blue color component of a light which comes from the original document so as to accumulate electric charge, the amount of which depends on the amount of the light received; a driving mechanism that moves either one of the photoelectric conversion element or the original document in a predetermined direction with respect to the other; a detection sensor that detects a vector amount of movement of either one of the photoelectric conversion element or the original document in the predetermined direction with respect to the other so as to output a detection signal for each vector amount of movement that corresponds to a minimum unit of a reading area of the image; and a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration, wherein the control section selects and executes either one of a first control or a second control based on a predetermined condition information, where in the first control the electric charge of the photoelectric conversion element is discarded during a time period in each cycle after the electric charge discharge operation for the last color component but before the outputting of the detection signal, whereas such a discarding operation is not executed in the second control.

Other features and advantages offered by the invention will be fully understood by referring to the following detailed description in conjunction with the accompanied drawings.

BRIEF DESCRIPTION OF THE DRAWINGS

The invention will be described with reference to the accompanying drawings, wherein like numbers reference like elements.

FIG. 12A is an operation timing chart that explains, as an example, the timing of the light emission operation of the exposure lamp 46 that is executed on the basis of the clock signal Sc, the open/close operation of gates 84 of the image sensor 50, and so on.

FIG. 12B is an explanatory diagram that schematically illustrates a problem inherent in the second control.

FIG. 16 is a flowchart that illustrates procedures for selecting either one of the first control and the second control on the basis of input via a manipulation panel 18.

FIG. 17B is an explanatory diagram that schematically illustrates a problem inherent in the second control.

FIG. 17C is an explanatory diagram that schematically illustrates an example of the operation timing of the light reception operation and the electric charge discharge operation when the first control is adopted.

DESCRIPTION OF EXEMPLARY EMBODIMENTS

Figure 1:
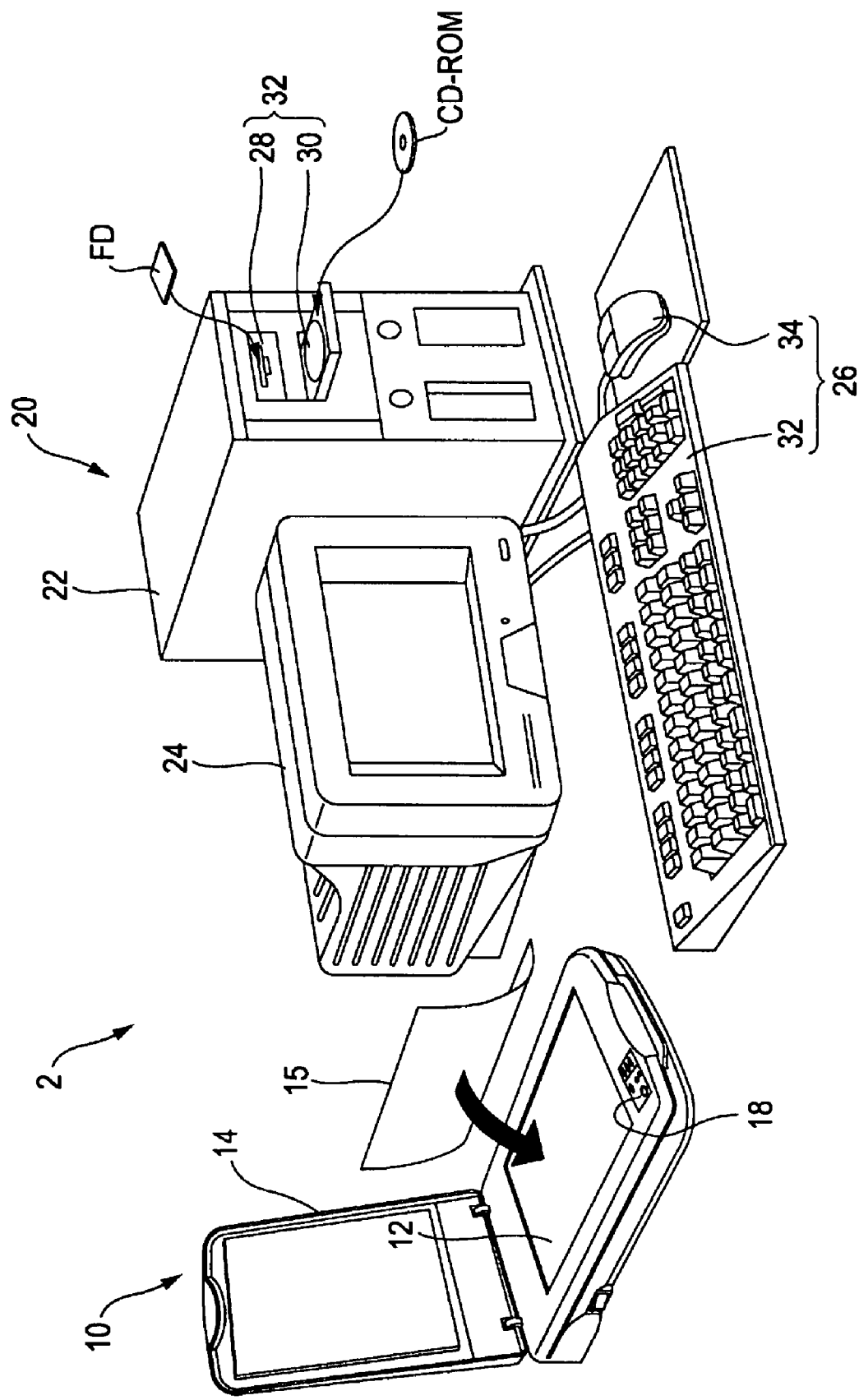
FIG. 1 is a perspective view that schematically illustrates an example of an image reading system 2.

Referring to the following detailed description in conjunction with the accompanied drawings, one will fully understand at least the following preferred embodiments of the invention.

In one aspect, the invention is directed to an image reading apparatus that scans an image from an original document, where the image reading apparatus includes: (A) a light source that irradiates a light to the original document; (B) a photoelectric conversion element that selectively receives a red color component, a green color component, and a blue color component of a light which comes from the original document so as to accumulate electric charge, the amount of which depends on the amount of the light received; (C) a driving mechanism that moves either one of the photoelectric conversion element or the original document in a predetermined direction with respect to the other; (D) a detection sensor that detects a vector amount of movement of either one of the photoelectric conversion element or the original document in the predetermined direction with respect to the other so as to output a detection signal for each vector amount of movement that corresponds to a minimum unit of a reading area of the image; and (E) a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration, wherein the control section selects and executes either one of a first control or a second control based on a predetermined condition information, where in the first control the electric charge of the photoelectric conversion element is discarded during a time period in each cycle after the electric charge discharge operation for the last color component but before the outputting of the detection signal, and such a discarding operation is not executed in the second control.

According to an image reading apparatus having such a configuration, user will enjoy an enhanced user-friendliness because they are allowed to choose between the first control, which is selected when the image quality is given a higher priority, and the second control, which is selected when the reading speed is given a higher priority.

More specifically, when the first control is selected, a discarding processing is performed for discarding the electric charge of the photoelectric conversion element during a time period in each cycle after the electric charge discharge operation for the last color component but before the outputting of the detection signal. Therefore, it is possible to effectively avoid defective image scanning that might occur due to any delay in the output timing of the detection signal. In other words, it is possible to effectively avoid any unwanted additional electric charge is accumulated due to the presence of a dark current, etc. for a length of time equal to the delay in the output timing of the detection signal, making the entire amount of the electric charge actually accumulated larger than the amount of electric charge that is supposed to be accumulated during the light reception time duration. Consequently, it is possible to enhance the quality of an image. On the other hand, when the second control is selected, the discarding processing described above is not carried out when an image is scanned; and therefore, it is possible to perform image scanning in a higher speed than the first control described above because of the saving of time required for the execution of the discarding processing according to the first control. User-friendliness is enhanced because the user is allowed to select either the first control or the second control, depending on the requirements of each specific situation, between quality-oriented scanning in which a higher priority is given to the quality of an image and speed-oriented scanning in which a higher priority is given to the processing speed of a scanning job.

In one embodiment of the invention, the predetermined condition information is information on reading resolution that defines the minimum unit of the reading area of the image, and the control section selects the first control when the reading resolution is a first resolution, whereas the control section selects the second control when the reading resolution is a second resolution, the second resolution being lower than the first resolution.

According to such an image reading apparatus, the scanning operation executed thereby satisfies the needs of user. Generally speaking, a higher importance is placed on the quality of an image when the reading resolution is high whereas a higher importance is placed on the processing speed of scanning when the reading resolution is low. According to the image reading apparatus having the above-described configuration, the first control is selected so as to achieve a higher image quality when the reading resolution is the first resolution, whereas the second control is selected so as to achieve a faster scanning when the reading resolution is the second resolution, the second resolution being lower than the first resolution. Consequently, it is possible to perform an ideal scanning operation in accordance with the needs of user.

In one embodiment of the invention, the predetermined condition information is information on a moving speed target value at which either one of the photoelectric conversion element or the original document is moved with respect to the other, the moving speed target value is constant from the start of scanning of the image through the end of scanning of the image, and the control section selects the first control when the target value is a first speed, whereas the control section selects the second control when the target value is a second speed, the second speed being higher than the first speed.

According to such an image reading apparatus, it is possible to ensure that the degradation in image quality due to the presence of a dark current, etc. is avoided, and also to effectively prevent the scanning speed from being undesirably decreased because of the execution of the first control when it is not actually necessary.

Generally speaking, when the target item that is to be controlled is a speed, the overall performance of control, or controllability, tends to become poor due to mechanical resistance, etc., such as a friction, etc., of the driving mechanism as the speed becomes lower. This could result in a larger delay in the output timing of the detection signal, which invites the degradation in image quality due to the presence of a dark current, etc.

In this respect, according to the image reading apparatus described above, the first control is performed for the first speed, which is relatively lower and thus vulnerable to the degradation in image quality due to the presence of a dark current, etc., whereas the second control is performed for the second speed, which is relatively higher and thus less vulnerable to the degradation in image quality. Therefore, it is possible to ensure that the degradation in image quality due to the presence of a dark current, etc. is avoided, and also to effectively prevent the scanning speed from being undesirably decreased because of the execution of the first control when it is not actually necessary.

In one embodiment of the invention, the predetermined condition information is information on an amount of variation in moving speed at which either one of the photoelectric conversion element or the original document is moved with respect to the other, and the control section selects the first control when the amount of variation is not less than a threshold value, whereas the control section selects the second control when the amount of variation is less than the threshold value.

According to such an image reading apparatus, it is possible to ensure that the degradation in image quality due to the presence of a dark current, etc. is avoided, and also to effectively prevent the scanning speed from being undesirably decreased because of the execution of the first control when it is not actually necessary.

Generally speaking, as the amount of variation in moving speed becomes greater, the output delay of the detection signal described above becomes longer, which invites the degradation in image quality due to the presence of a dark current, etc.

In this respect, according to the image reading apparatus described above, the first control is performed when the amount of variation is relatively larger and thus vulnerable to the degradation in image quality due to the presence of a dark current, etc., whereas the second control is performed when the amount of variation is relatively smaller and thus less vulnerable to the degradation in image quality. Therefore, it is possible to ensure that the degradation in image quality due to the presence of a dark current, etc. is avoided, and also to effectively prevent the scanning speed from being undesirably decreased because of the execution of the first control when it is not actually necessary.

In one embodiment of the invention, the predetermined condition information is information that indicates which one of the first control or the second control is selected, and the image reading apparatus further includes an input section that allows user to input such information. According to such an image reading apparatus, it is possible for user to select and execute either one of the first control and the second control depending on the requirements of each specific situation, which will enhance user-friendliness.

In one embodiment of the invention, the image reading apparatus further comprises an original document table on which the original document is placed and a carriage that is moved in the predetermined direction by the driving mechanism, and where the light source and the photoelectric conversion element(s) are provided in the carriage.

In one embodiment of the invention, the light source further comprises a red light emitting diode that emits a light of red color component only, a green light emitting diode that emits a light of green color component only, and a blue light emitting diode that emits a light of blue color component only, and, in each cycle, the control section turns on the light emitting diode once for each color at the predetermined time interval in the predetermined color order and turns off thereof after a lapse of the light reception time duration from the light-up (i.e. the turning-on of the LED), and takes electric charge out of the photoelectric conversion element after the light emitting diode has been turned off but before the light emitting diode of the next color is turned on.

In one embodiment of the invention, the control section further comprises a clock pulse generation section that outputs, in each of the cycles, clock pulses at the predetermined time interval where the point in time when the detection signal is outputted is used as a starting point thereof such that the initial clock pulse is outputted in synchronization with the outputting of the detection signal; and when the first control is selected, the control section turns on the light emitting diode in the predetermined color order based on a clock pulse outputted from the clock pulse generation section, and takes electric charge out of the photoelectric conversion element based on a clock pulse subsequent to the previous clock pulse, which was used for triggering the light-up (i.e. the turning-on of the LED); and electric charge that is accumulated in the photoelectric conversion element during a time period in the cycle after the electric charge discharge operation for the last color component but before the outputting of the detection signal is discarded based on the outputting of the detection signal.

According to such an image reading apparatus, since electric charge for each color component is taken out based on the corresponding one of clock pulses that are outputted at a predetermined time interval, it is possible to equalize electric charge that is accumulated in the photoelectric conversion element(s) due to the presence of a dark current, etc., during a time period from the end of the light reception time duration until the discharge of the electric charge. That is, it is possible to equalize the effect of the presence of a dark current, etc., for each color component. Thus, the quality of an image is improved.

In one embodiment of the invention, when the second control is selected, the control section turns on the light emitting diode in the predetermined color order based on a clock pulse, and takes electric charge out of the photoelectric conversion element based on a clock pulse subsequent to the previous clock pulse, which was used for triggering the light-up (i.e. the turning-on of the LED); and as for the last color component in the cycle, electric charge of the last color component is taken out of the photoelectric conversion element based on the outputting of the detection signal.

In one embodiment of the invention, the image reading apparatus further comprises an output cycle time t, wherein D denotes the vector amount of movement that corresponds to the minimum unit of the reading area of the image and V denotes the moving speed target value at which either one of the photoelectric conversion element or the original document is moved with respect to the other, the output cycle time t of the clock pulse in a case where the second control is selected is expressed mathematically as $t=(D/V)/3$.

According to such an image reading apparatus, when the second control is selected, it is possible to allocate a light reception time duration having an equal length for each of red color component, green color component, and blue color component of a light; and therefore, it is possible to effectively avoid the phenomenon of a defective image scanning that might occur due to non-uniform light reception time duration for each color component varying from one to another.

In one embodiment of the invention, the image reading apparatus further comprises a plurality of the photoelectric conversion elements oriented in an orthogonal direction that is perpendicular to the predetermined direction.

Another preferred embodiment of the invention is an image reading apparatus that scans an image from an original document, where the image reading apparatus includes: a light source that irradiates a light to the original document; a photoelectric conversion element that selectively receives a red color component, a green color component, and a blue color component of a light which comes from the original document so as to accumulate electric charge, the amount of which depends on the amount of the light received; a driving mechanism that moves either one of the photoelectric conversion element or the original document in a predetermined direction with respect to the other; a detection sensor that detects a vector amount of movement of either one of the photoelectric conversion element or the original document in the predetermined direction with respect to the other so as to output a detection signal for each vector amount of movement that corresponds to a minimum unit of a reading area of the image; and a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration, wherein the control section selects and executes either one of a first control or a second control based on a predetermined condition information, where in the first control the electric charge of the photoelectric conversion element is discarded during a time period in each cycle after the electric charge discharge operation for the last color component but before the outputting of the detection signal, whereas such a discarding operation is not executed in the second control; wherein the condition information is information on reading resolution that defines the minimum unit of the reading area of the image, and the control section selects the first control when the reading resolution is a first resolution, whereas the control section selects the second control when the reading resolution is a second resolution, which is lower than the first resolution; wherein the image reading apparatus is provided with an original document table on which the original document is placed and a carriage that is moved in the predetermined direction by the driving mechanism, where the light source and the photoelectric conversion element(s) are provided in the carriage; wherein the light source has a red light emitting diode that emits a light of red color component only, a green light emitting diode that emits a light of green color component only, and a blue light emitting diode that emits a light of blue color component only, and, in each cycle, the control section turns on the light emitting diode once for each color at the predetermined time interval in the predetermined color order and turns off thereof after a lapse of the light reception time duration from the light-up (i.e. the turning-on of the LED), and takes electric charge out of the photoelectric conversion element after the light emitting diode has been turned off but before the light emitting diode of the next color is turned on; wherein the control section has a clock pulse generation section that outputs, in each of the cycles, clock pulses at the predetermined time interval where the point in time when the detection signal is outputted is used as a starting point thereof in such a manner that the initial clock pulse is outputted in synchronization with the outputting of the detection signal; and when the first control is selected, the control section turns on the light emitting diode in the predetermined color order based on a clock pulse outputted from the clock pulse generation section, and takes electric charge out of the photoelectric conversion element based on a clock pulse subsequent to the previous clock pulse, which was used for triggering the light-up; and electric charge that is accumulated in the photoelectric conversion element during a time period in the cycle after the electric charge discharge operation for the last color component but before the outputting of the detection signal is discarded based on the outputting of the detection signal; wherein, when the second control is selected, the control section turns on the light emitting diode in the predetermined color order based on a clock pulse, and takes electric charge out of the photoelectric conversion element based on a clock pulse subsequent to the previous clock pulse, which was used for triggering the light-up; and as for the last color component in the cycle, electric charge of the last color component is taken out of the photoelectric conversion element based on the outputting of the detection signal; and a plurality of the photoelectric conversion elements is provided in an orthogonal direction that is perpendicular to the aforementioned predetermined direction.

In one aspect, the invention is directed toward an image reading system that has a computer and an image reading apparatus that scans an image from an original document, the image reading apparatus being connected to the computer so as to allow communication therebetween, where the image reading apparatus includes: a light source that irradiates a light to the original document; a photoelectric conversion element that selectively receives a red color component, a green color component, and a blue color component of a light which is reflected from or transmitted through the original document so as to accumulate electric charge, the amount of which depends on the amount of the light received; a driving mechanism that moves either one of the photoelectric conversion element or the original document in a predetermined direction with respect to the other; a detection sensor that detects a vector amount of movement of either one of the photoelectric conversion element or the original document in the predetermined direction with respect to the other so as to output a detection signal for each vector amount of movement that corresponds to a minimum unit of a reading area of the image; and a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration, wherein the control section selects and executes either one of a first control or a second control based on a predetermined condition information, where in the first control the electric charge of the photoelectric conversion element is discarded during a time period in each cycle after the electric charge discharge operation for the last color component but before the outputting of the detection signal, whereas such a discarding operation is not executed in the second control.

Image Reading System 2

Figure 2:
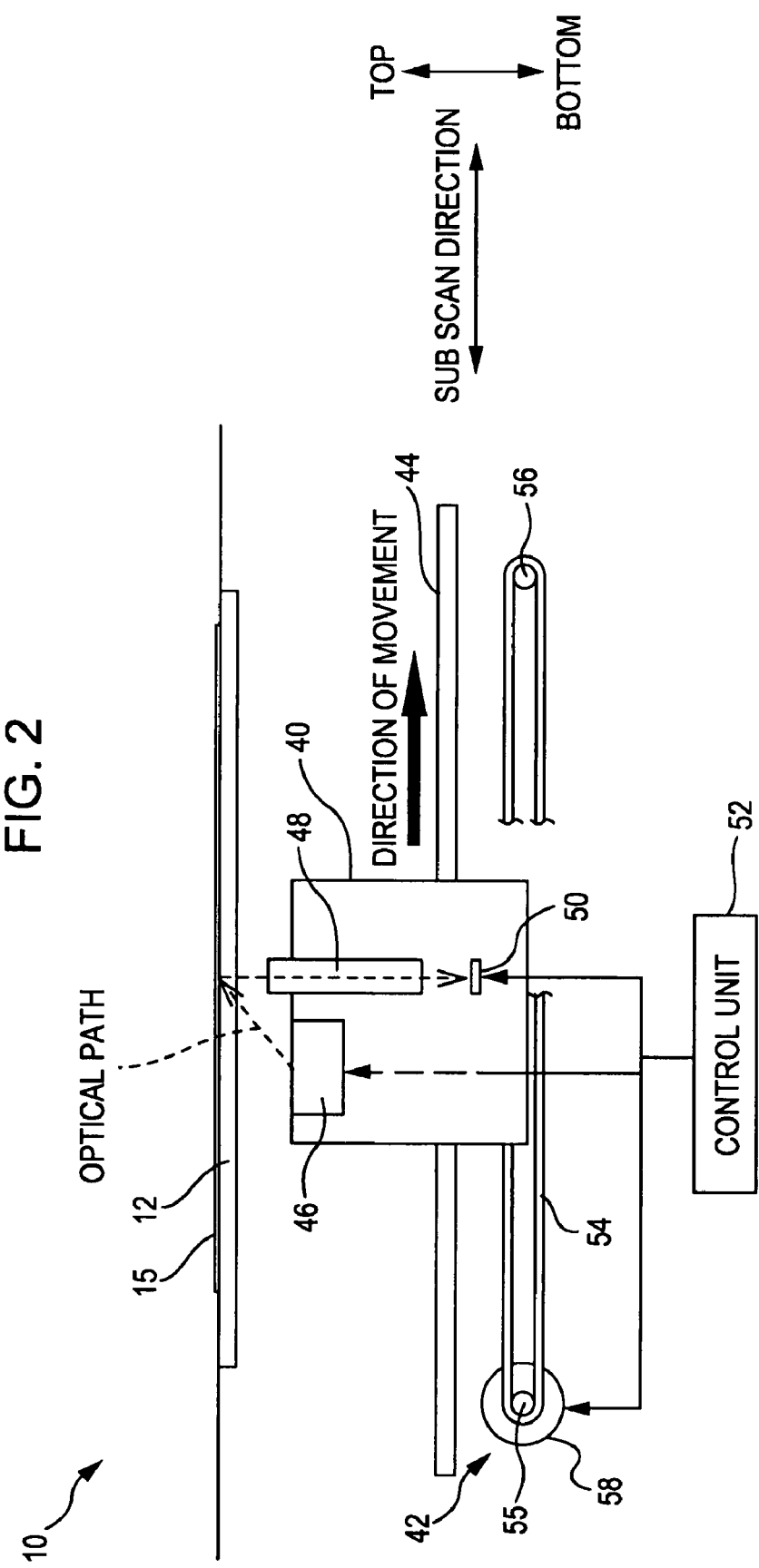
FIG. 2 is an explanatory diagram that schematically illustrates an example of the internal configuration of an image reading apparatus 10.
Figure 3:
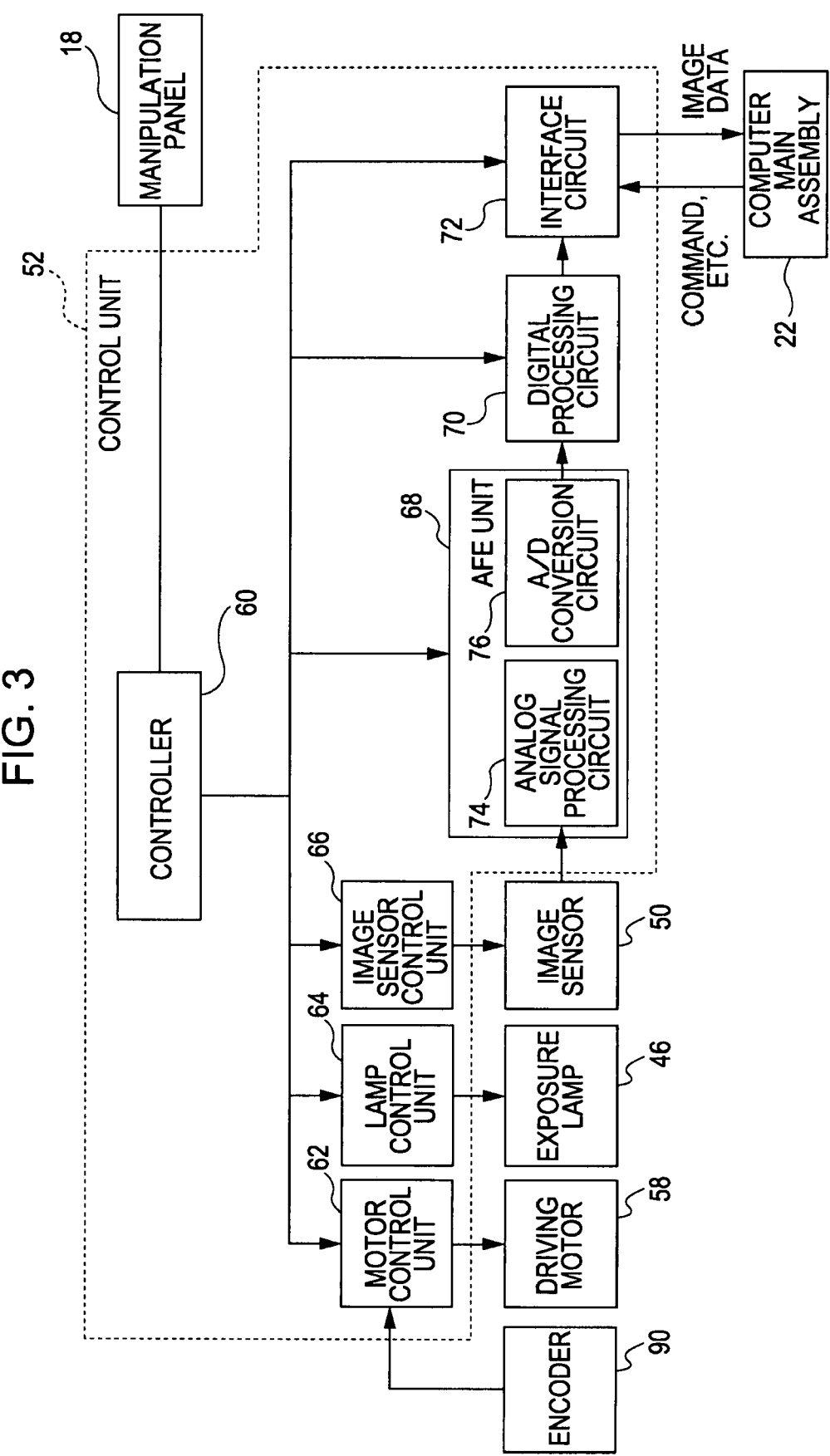
FIG. 3 is a block diagram that schematically illustrates an example of the system configuration of the image reading apparatus 10.

FIGS. 1-3 are explanatory diagrams each of which illustrates an image reading system 2. FIG. 1 is a perspective view that schematically illustrates an example of the image reading system 2. FIG. 2 is an explanatory diagram that schematically illustrates an example of the internal configuration of an image reading apparatus 10. FIG. 3 is a block diagram that schematically illustrates an example of the system configuration of an image reading apparatus 10.

As illustrated in FIG. 1, the image reading system 2 has the image reading apparatus 10 and a computer apparatus 20, which is connected to the image reading apparatus 10 so as to allow communication therebetween.

The image reading apparatus 10 is typically called as an image scanner. The image reading apparatus 10, or the image scanner, is provided with an original document table glass 12 (which corresponds to the original document table), and an original document table cover 14, which opens or shuts the top surface portion of the original document table glass 12. On the top surface portion of the original document table glass 12, an original document 15, which is to be scanned, is placed. A manipulation panel 18 (which corresponds to an input section) is provided in front of the original document table glass 12 so that user can input various setting information via the manipulation panel 18.

As illustrated in FIG. 1, the computer apparatus 20 is provided with a computer main assembly 22, a display apparatus 24, and input devices 26. A so-called personal computer, etc., is employed as the computer main assembly 22, which is provided with a central processing unit (CPU), various memories such as RAM, ROM, and so on, and reading apparatuses 32 such as an FD drive apparatus 28, a CD-ROM/DVD drive apparatus 30, and so on. A CRT display, a liquid crystal display, or other similar display device is used as the display apparatus 24. As input devices 26, a keyboard 34, a computer mouse 36, and so on, are used.

Image Reading Apparatus 10

As illustrated in FIG. 2, the image reading apparatus 10 has, as its inner configuration components, a carriage 40, a driving mechanism 42 that moves the carriage 40 along sub-scan axial direction while maintaining a predetermined constant distance with respect to the original document table glass 12, and a guide 44 that supports the carriage 40 and guides it along the sub-scan axial direction in a movable manner.

The carriage 40 has an exposure lamp 46 functioning as a light source that irradiates a light to the original document 15 through the original document table glass 12, a lens 48 into which a light reflected by the original document 15 enters, and an image sensor 50 that receives the reflected light that has entered inside the carriage 40 through the lens 48. The image sensor 50 is constituted by a linear CCD sensor, etc., in which photoelectric conversion elements 80, which converts an optical signal into an electric signal, are arranged to form a line in the main scan direction (a direction that penetrates through the sheet of FIG. 2), which is orthogonal to the sub scan direction. Image data scanned by the image sensor 50 is outputted in the form of an analog signal to a control unit 52.

The driving mechanism 42 has a timing belt 54 that is connected to the carriage 40, a pair of pulleys 55 and 56 which the timing belt 54 is stretched on and therebetween, and a driving motor 58 that drives and rotates one of the pulleys, that is, the pulley 55. An example of the driving motor 58 is a so-called DC motor, the driving of which is controlled by a control signal coming from the control unit 52.

As illustrated in FIG. 3, the control unit 52 is provided with a controller 60, a motor control unit 62, a lamp control unit 64, an image sensor control unit 66, an AFE (Analog Front End) unit 68, a digital processing circuit 70, and an interface circuit 72. These control units and circuits 62, 64, 66, 68, 70, and 72 as well as the manipulation panel 18 described above are connected to the controller 60 so as to allow communication therebetween.

Upon reception of a scan command signal coming from the computer main assembly 22, the controller 60 controls the motor control unit 62, the lamp control unit 64, the image sensor control unit 66, the AFE (Analog Front End) unit 68, the digital processing circuit 70, and the interface circuit 72.

Figure 4:
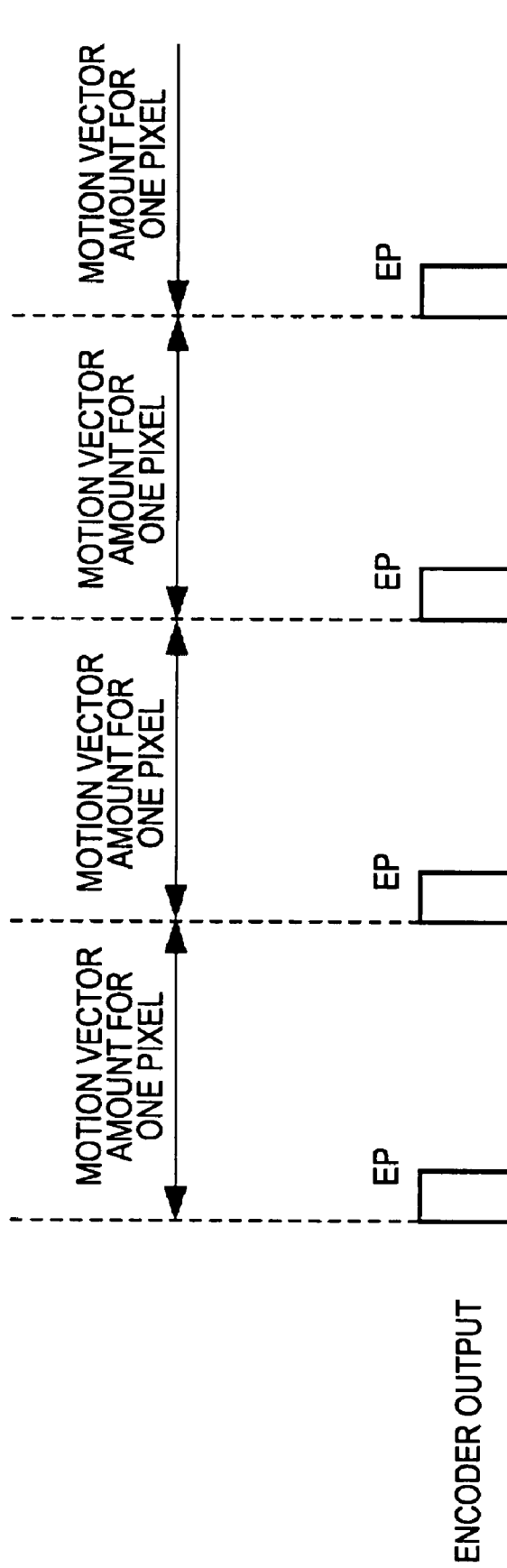
FIG. 4 is an explanatory diagram that schematically illustrates a detection signal EP that is outputted from an encoder 90.

In response to an instruction signal issued from the controller 60, the motor control unit 62 controls the driving operation of the driving motor 58 for moving the carriage 40. As a driving control, a so-called feedback control is performed so as to constantly move the carriage 40 at a moving speed of a predetermined target value. Information on the target value of moving speed is affixed to the instruction signal given from the controller 60. A rotary encoder that is provided in the driving motor 58 calculates the actual value of moving speed (which corresponds to a detection sensor). More specifically, as illustrated in FIG. 4, a detection signal EP is outputted from the encoder 90 at each time when the carriage 40 is driven by the driving motor 58 to move in the sub scan direction by the motion vector amount that corresponds to one pixel; and then, the detection signal EP is sent to the motor control unit 62 so that the actual value of moving speed of the carriage 40 is calculated in an appropriate control cycle based on the detection signal EP. Then, the motor control unit 62 performs feedback control on the driving motor 58 so that the actual value thereof agrees with the target value thereof. It should be noted that the "pixel" described above, and throughout this specification, means the minimum unit of an image reading area, where the size thereof is determined depending on reading resolution. For example, if the reading resolution is 360 dpi (dot per inch), the size of a pixel is ⅟₃₆₀ inch.

The lamp control unit 64 illustrated in FIG. 3 controls the light emission operation of the exposure lamp 46. The image sensor control unit 66 controls various operations of the image sensor 50.

The AFE unit 68 is provided with an analog signal processing circuit 74 and an A/D conversion circuit 76. The analog signal processing circuit 74 performs signal processing on image data outputted from the image sensor 50, which is in the format of an analog signal. The A/D conversion circuit 76 performs A/D conversion processing on the image signal subjected to signal processing at the analog signal processing circuit 74 so as to convert the analog signal into a digital one.

The digital signal processing circuit 70 performs digital signal processing on a digital signal sent from the A/D conversion circuit 76 of the AFE unit 68. Here, the signal is subjected to various kinds of image processing such as correction processing, including but not limited to, shading compensation. A digital signal subjected to the digital signal processing is finally outputted to an external device, that is, the computer main assembly 22, which the image reading apparatus 10 is connected to, via the interface circuit 72 as image data scanned from the original document 15. In addition to the above function, the interface circuit 72 receives various kinds of commands issued from the computer main assembly 22 to the image reading apparatus 10.

Carriage 40

Figure 5:
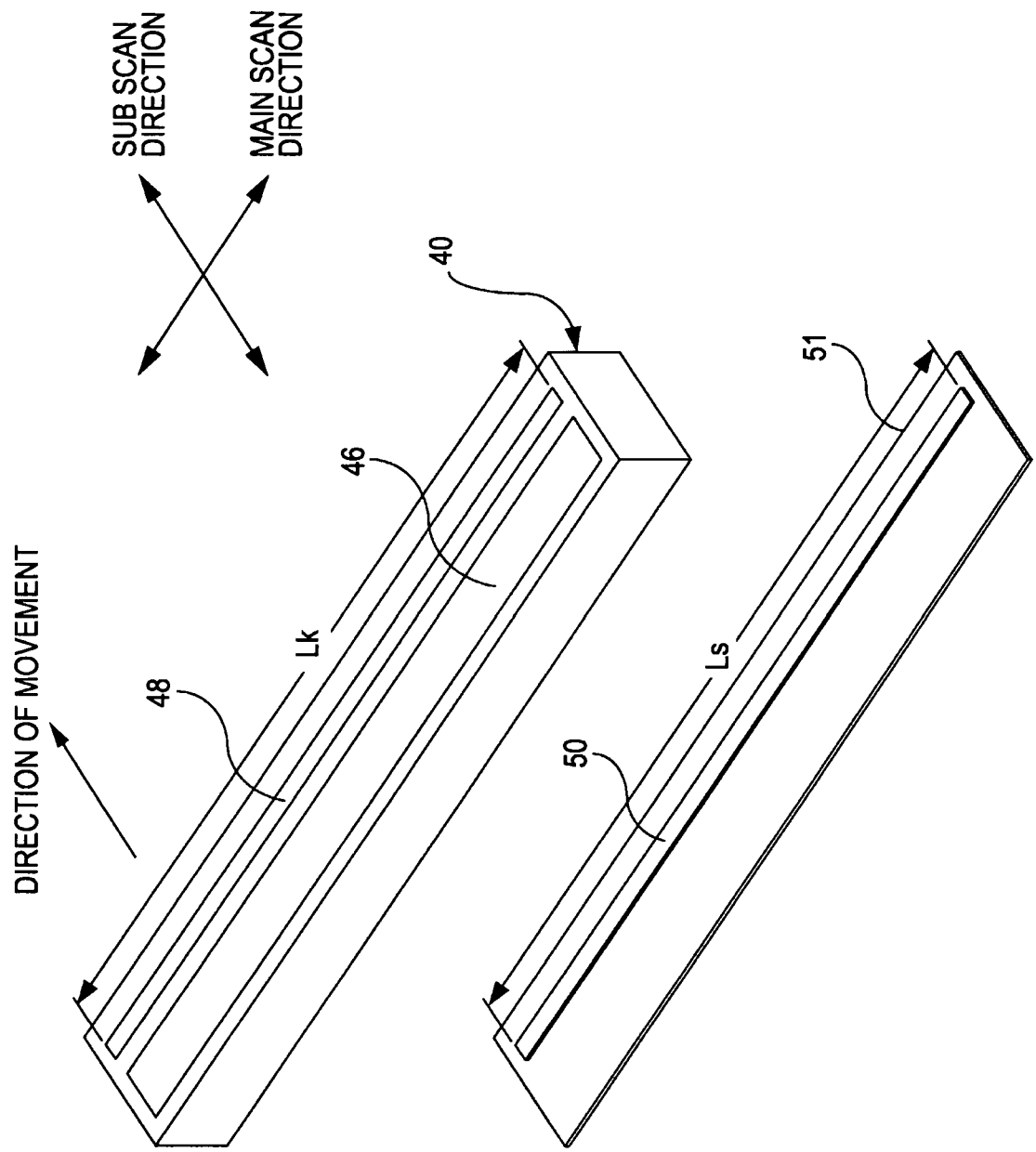
FIG. 5 is an exploded perspective view of an example of a carriage 40.

FIG. 5 is an exploded perspective view of an example of the carriage 40. As illustrated in the above-identified figure, the carriage 40 has an elongated body, the longer side of which extends in the main scan direction that is orthogonal to the sub scan direction (i.e. the direction in which the carriage 40 moves). When image scanning is performed, the carriage 40 moves in the sub scan direction in a sliding manner.

The image sensor 50 is provided at the lower side inside the carriage 40. At the upper side of the carriage 40, the lens 48 for entering a light into the image sensor 50 is provided so that it is opposed to the original document table glass 12. A light reflected from the original document 15 enters into the lens 48. The lens 48 is arranged in the longitudinal direction (main scan direction) of the carriage 40. In addition thereto, in the upper side of the carriage 40, the exposure lamp 46 that irradiates a light to the original document 15 via the original document table glass 12 is provided in parallel with the lens 48. The length Lk in the longitudinal direction of the lens 48 and the exposure lamp 46 is determined so that it corresponds to the maximum dimension in the main scan direction of the original document 15 that could be placed on the original document table glass 12.

A substrate 51 on which the image sensor 50 is provided is arranged inside the carriage 40. As illustrated in the figure, the image sensor 50 is provided along the longitudinal direction of the carriage 40, that is, the main scan direction, in such a manner that the arranged image sensor 50 corresponds in position to the lens 48 described above. The overall length Ls of the image sensor 50 is set so that it corresponds to the overall length Lk of the lens 48. On the upper surface portion of the image sensor 50, a plurality of the photoelectric conversion elements 80 is arranged in the longitudinal direction (main scan direction) (refer to FIG. 9).

Figure 6:
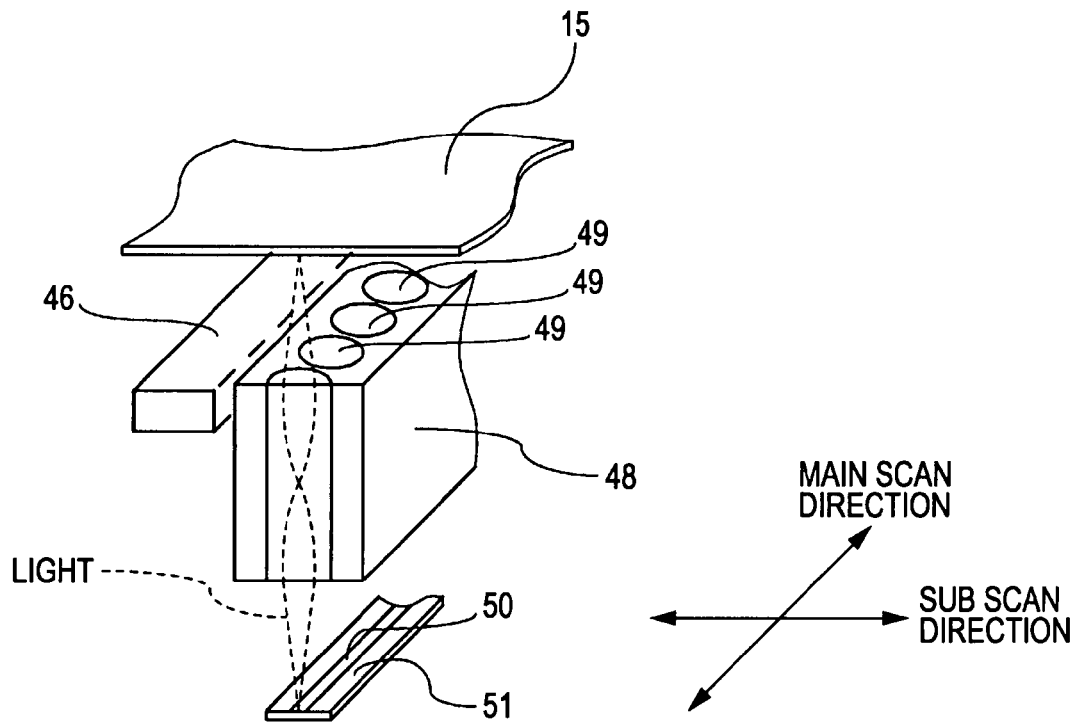
FIG. 6 is a schematic diagram that illustrates an example of the positional relationship between a lens 48 and an image sensor 50.

FIG. 6 is a schematic diagram that illustrates an example of the positional relationship between the lens 48 and the image sensor 50. The lens 48 has a plurality of individual lenses 49. The plurality of individual lenses 49 is arranged in the longitudinal direction of the lens 48, that is, the main scan direction. A light that enters into each of the individual lenses 49 is received by a corresponding part of the plurality of photoelectric conversion elements 80 that is provided on the image sensor 50.

Exposure Lamp 46

Figure 7:
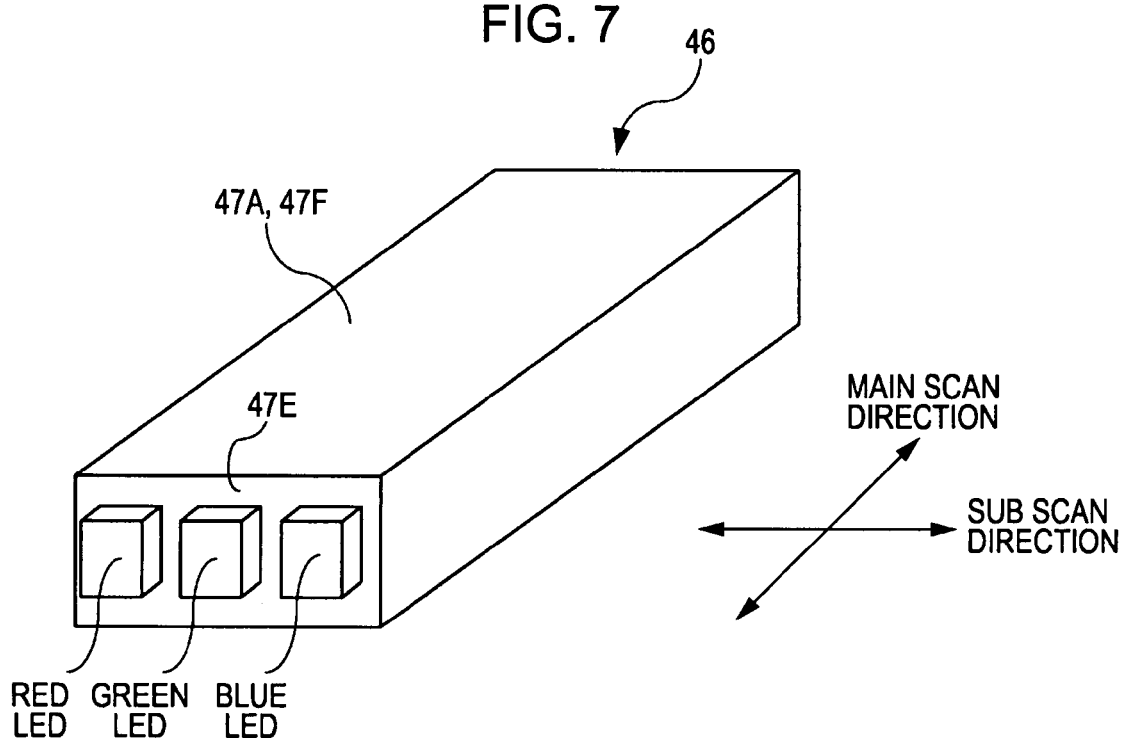
FIG. 7 is a perspective view that illustrates an example of an exposure lamp 46.

FIG. 7 is a perspective view that illustrates an example of the exposure lamp 46. As illustrated in the above-identified figure, the exposure lamp 46 is provided with a light guiding body 47A and three color-types of light emitting diodes (referred to also as LED throughout the specification) that have luminescent colors varying therebetween. These three color-types of LEDs include a red LED that emits a red light (R), a green LED that emits a green light (G), and a blue LED that emits a blue light (B). These three color-types of LEDs are provided on the side portion 47E of the light guiding body 47A.

The light guiding body 47A is arranged in parallel with the lens 48 along the longitudinal direction of the lens 48, which is the main scan direction. The light guiding body 47 takes inside itself a light emitted from each of the three color-types of LEDs provided on the side portion 47E of the light guiding body 47A itself, and then emits the light taken therein from the light exposure surface 47F provided at the top side thereof toward the original document 15 placed above. By this means, the light guiding body 47A irradiates a light to the original document 15 across its entire width in the main scan direction.

The color of a light emitted by the light guiding body 47A is determined based on the color of the LED that is turned on. That is, the light guiding body 47A emits a red light when the red LED is turned on. On the other hand, the light guiding body 47A emits a green light when the green LED is turned on, whereas the light guiding body 47A emits a blue light when the blue LED is turned on.

When an image is scanned from the original document 15 by the image sensor 50, these three color-types of LEDs light up at timing varying therebetween. That is, when the red LED is turned on, the green LED and the blue LED are turned off. On the other hand, when the green LED is turned on, the red LED and the blue LED are turned off, whereas the red LED and the green LED are turned off when the blue LED is turned on.

Figure 8:
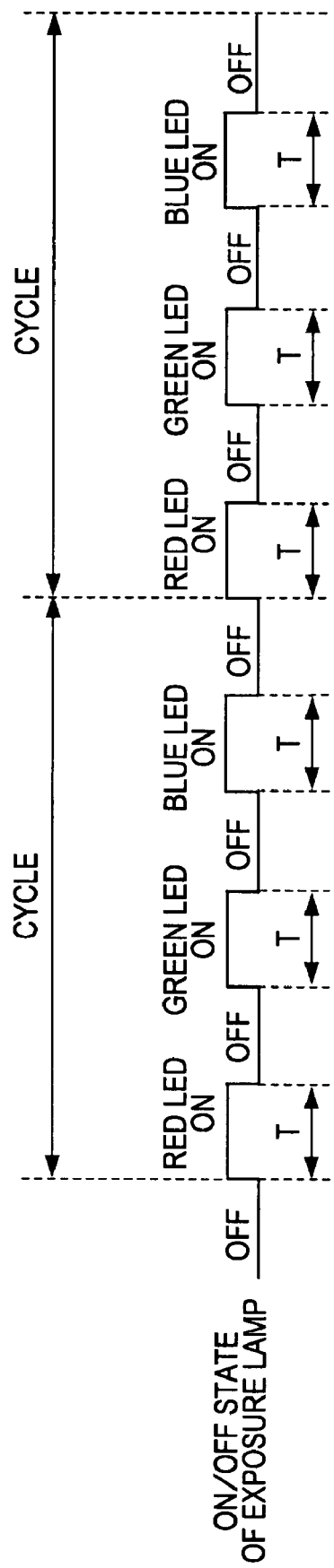
FIG. 8 is an explanatory diagram that illustrates an example of the order of light emission color of the exposure lamp 46.

FIG. 8 is an explanatory diagram that illustrates an example of the color order of light emission. Herein, it is assumed that the three color-types of LEDs are turned on in the color change order of red (R)→green (G)→blue (B), where the LED of each color is turned on for a predetermined light-up time period T. Accordingly, the exposure lamp 46 emits a light in the color change order of red (R)→green (G)→blue (B); and consequently, the original document 15 is illuminated in accordance with this color order. The light emission operation executed in the color change order of red (R)→green (G)→blue (B) constitutes one cycle, which is iterated for a continued operation. It should be noted that this cycle is executed at each time when a detection signal EP is outputted from the encoder 90 described above; or in other words, the cycle is executed once at each time when the carriage 40 moves in the sub scan direction by the motion vector amount that corresponds to one pixel.

Image Sensor 50

Figure 9:
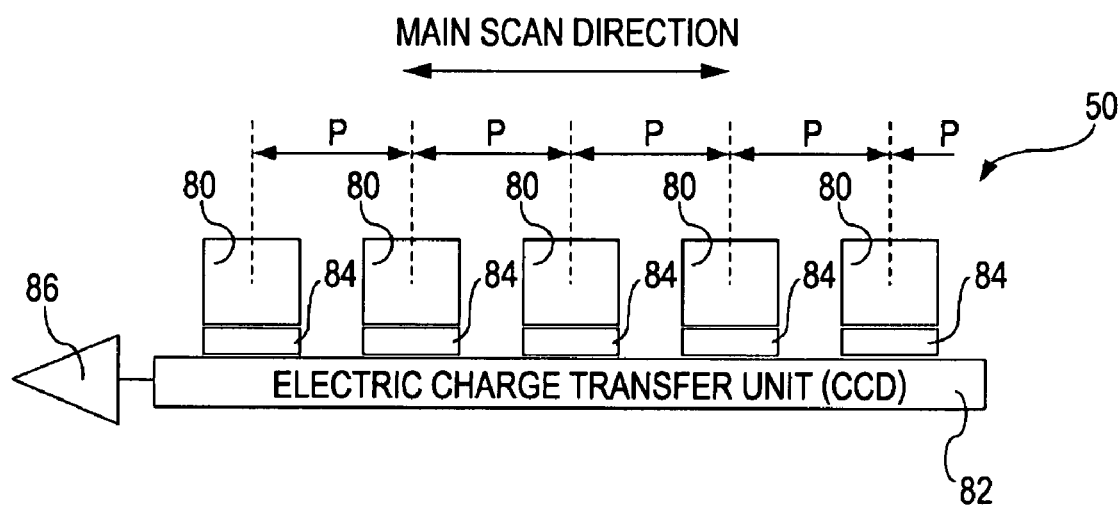
FIG. 9 is an explanatory diagram that schematically illustrates an example of the configuration of the image sensor 50.

FIG. 9 is an explanatory diagram that schematically illustrates an example of the configuration of the image sensor 50. As illustrated in FIG. 9, the image sensor is provided with the plurality of photoelectric conversion elements that are arranged in a line along the main scan direction with a predetermined pitch P, an electric charge transfer unit 82 that transfers electric charge taken out of each of the photoelectric conversion elements 80 in a predetermined transfer direction, a plurality of gates 84 each of which is provided between one of the photoelectric conversion elements 80 and the electric charge transfer unit 82, and a detection circuit 86 connected to one end of the electric charge transfer unit 82 at the transfer destination side.

An example of the photoelectric conversion elements 80 is photodiode devices 80, which generate and accumulate electric charge in accordance with the amount of light received. As the electric charge transfer unit 82, a so-called CCD (charge coupled device) is employed. The gates 84 take electric charge out of the photodiode devices 80 into the electric charge transfer unit 82 in an open state but does not take electric charge out of the photodiode devices 80 into the electric charge transfer unit 82 in a closed state. The electric charge discharge operation based on such an open/close state is achieved by means of a so-called potential well. The detection circuit 86 detects electric charge that is sent sequentially from the electric charge transfer unit 82, and outputs an analog signal in accordance with the amount of the detected electric charge for each electric charge.

Figure 10:
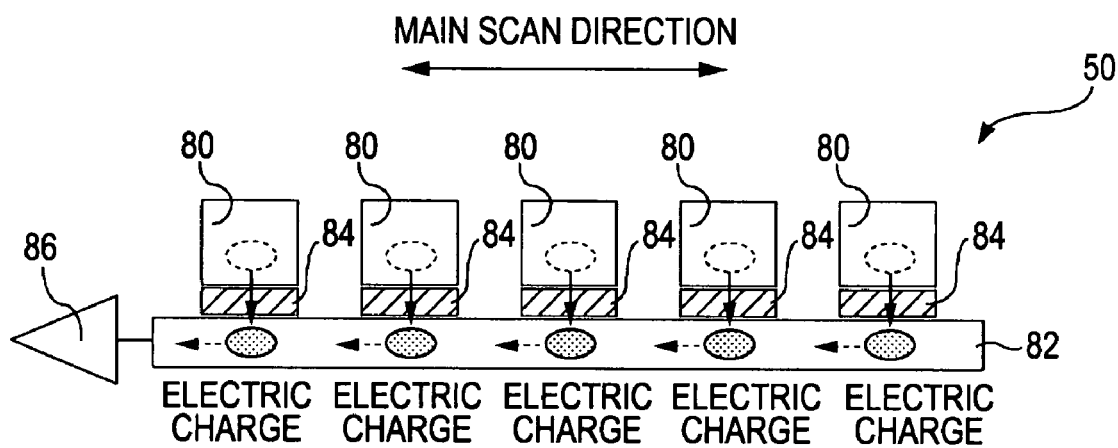
FIG. 10 is an explanatory diagram that schematically illustrates an example of the operation of the image sensor 50.

FIG. 10 is an explanatory diagram that schematically illustrates an example of the operation of the image sensor 50. When the exposure lamp 46 emits a light, which is then reflected by the original document 15 to be received by each of the photodiode devices 80, electric charge is generated and accumulated in each of the photodiode devices 80. Then, all of electric charge that is accumulated in the respective photodiode devices 80 is moved from the respective photodiode devices 80 to the electric charge transfer unit 82 concurrently when all of the gates 84 are opened concurrently, which means that the electric charge accumulated in each of the photodiode devices 80 is taken out in a simultaneous manner. Subsequently, each of electric charge aligned in the main scan direction at the electric charge transfer unit 82 is sequentially transferred toward the detection circuit 86 in manner of bucket brigade. Then, the detection circuit 86 outputs an analog signal in accordance with the amount of the detected electric charge for each electric charge.

The operation of the image sensor 50 described above, that is, a set of operations from the generation of electric charge at the photodiode devices 80 through the outputting of an analog signal is conducted at each time of light emission from the exposure lamp 46, that is, at each light emission operation for red (R), green (g), or blue (B) color component. Three colors of the analog signals generated through the light emission operation executed three times as described above constitute one pixel of data in the sub scan direction, which represents an image of the original document 15 read by the image sensor 50.

Operation Timing of Exposure Lamp 46 and Image Sensor 50

The timing of the above-described operations such as the light emission operation of the exposure lamp 46, the open/close operation of the gates 84 of the image sensor 50, and so on, is determined by a clock signal Sc. That is, on the basis of the clock signal Sc, the lamp control unit 64 and the image sensor control unit 66 cooperate with each other to control the exposure lamp 46 and the image sensor 50 respectively so as to perform the light emission operation and the open/close operation of the gates 84, etc., described above. A clock signal generation circuit 110 that generates the clock signal Sc (which corresponds to clock pulse generation section) is provided in the control unit 52.

Figure 11:
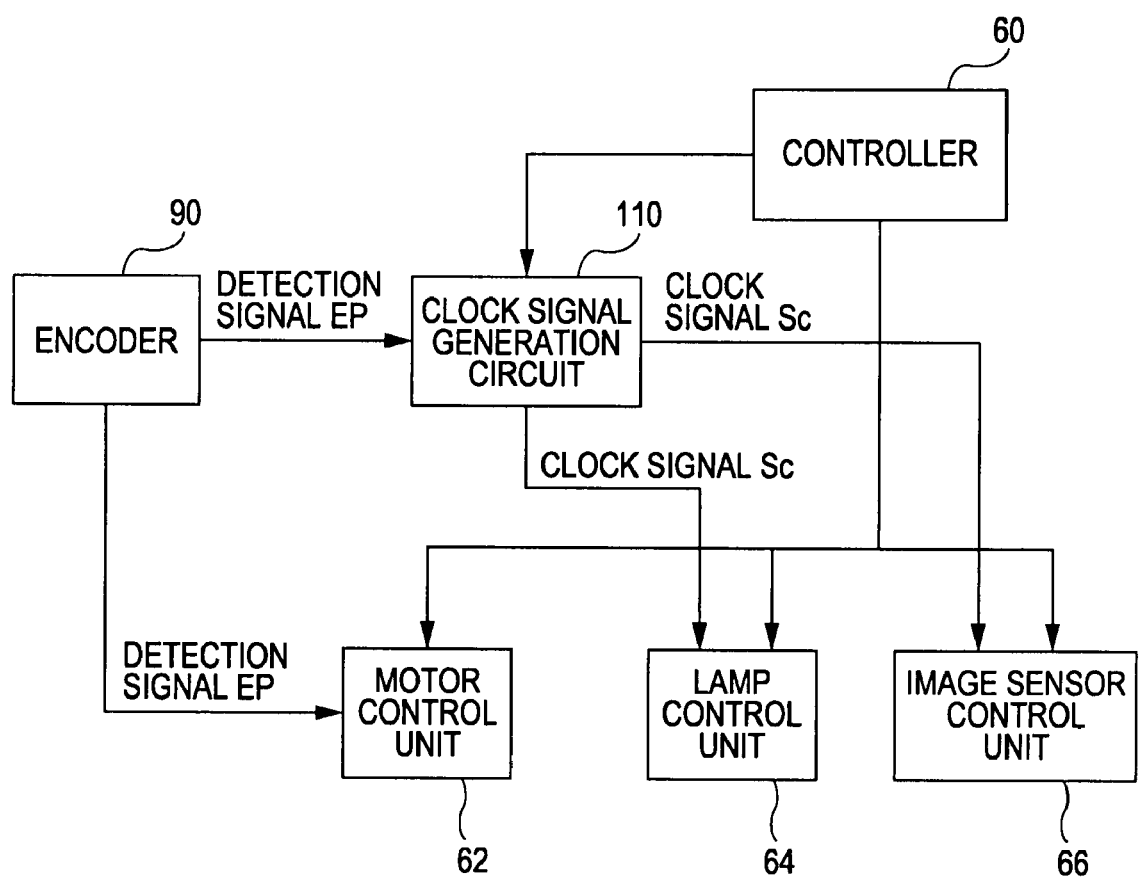
FIG. 11 is an explanatory block diagram that illustrates an example of a clock signal generation circuit 110.

FIG. 11 is an explanatory block diagram that illustrates an example of the clock signal generation circuit 110. As illustrated in the figure, the detection signal EP is inputted from the encoder 90 into the clock signal generation circuit 110. Then, on the basis of the detection signal EP, the clock signal generation circuit 110 generates the clock signal Sc. The generated clock signal Sc is outputted to the lamp control unit 64 and the image sensor control unit 66.

FIG. 12A is an operation timing chart that explains, as an example, the timing of the clock signal Sc, the light emission operation of the exposure lamp 46 that is executed on the basis of the clock signal Sc, the open/close operation of the gates 84 of the image sensor 50, and so on.

The clock signal Sc is generated at each time when the detection signal EP is outputted from the encoder 90. The clock signal Sc has three clock pulses CP (#1), CP (#2), and CP (#3). The first clock pulse CP (#1) is outputted in synchronization with the rising edge of the detection signal EP outputted from the encoder 90. The second clock pulse CP (#2) is outputted after a lapse of a predetermined time period t which starts from the rising edge of the first clock pulse CP (#1). Finally, the third clock pulse CP (#3) is outputted after a lapse of a predetermined time period t which starts from the rising edge of the second clock pulse CP (#2). All of clock pulses CP (#1), CP (#2), and CP (#3) take the form of a rectangular pulse having the same shape as those of the other two. It should be noted that, in the figure, the reason why a time interval between the rising edge of the third clock pulse CP (#3) in a certain cycle and the rising edge of the first clock pulse CP (#1) in the next cycle is denoted as t', rather than t, is that the output timing of the first clock pulse CP (#1) is subjected to variation depending on a possible delay in the outputting of the detection signal EP, which means that this time interval is not always equal to the predetermined time t. In other words, if it is assumed that there is not any delay in the outputting of the detection signal EP, which is an ideal condition, the above time interval t' agrees with the predetermined time t, where the figure illustrates such an ideal condition.

Then, as illustrated in the figure, after the outputting of the first clock pulse CP (#1), the red LED of the exposure lamp 46 turns on for a predetermined light-up time period T after a lapse of a predetermined time t1 which starts at the falling edge of the first clock pulse CP (#1). Upon the lighting-up of the red LED, electric charge whose amount is approximately in accordance with the amount of the red light received during the turn-on time period T is accumulated in each of photodiode devices 80 of the image sensor 50.

Each of the accumulated electric charge is taken out of the corresponding one of the photodiode devices 80 into the electric charge transfer unit 82 when all of the gates 84 are opened concurrently in synchronization with the rising edge of the second clock pulse CP (#2). It should be noted that the length of time period during which the gates 84 are in an open state is equal to the pulse width tc of the clock pulses CP. After a lapse of a predetermined time tt which starts from the falling edge of the clock pulse CP (#2) at which the gates 84 are closed, the electric charge transfer unit 82 starts the operation of transferring electric charge to the detection circuit 86. Thereafter, the transfer operation is ended when the detection circuit 86 has completed the detection of all electric charge. By this means, an analog signal for red color component is outputted from the detection circuit 86 for each electric charge.

After a lapse of a predetermined time t1 that starts at the falling edge of the second clock pulse CP (#2), the green LED of the exposure lamp 46 turns on for the predetermined light-up time period T. Upon the lighting-up of the green LED, electric charge whose amount is approximately in accordance with the amount of the green light received during the turn-on time period T is accumulated in each of photodiode devices 80 of the image sensor 50. Each of the accumulated electric charge is taken out of the corresponding one of the photodiode devices 80 into the electric charge transfer unit 82 when all of the gates 84 are opened concurrently in synchronization with the rising edge of the third clock pulse CP (#3). After a lapse of a predetermined time tt which starts from the falling edge of the clock pulse CP (#3) at which the gates 84 are closed, the electric charge transfer unit 82 starts the operation of transferring electric charge to the detection circuit 86. Thereafter, the transfer operation is ended when the detection circuit 86 has completed the detection of all electric charge. By this means, an analog signal for green color component is outputted from the detection circuit 86 for each electric charge.

After a lapse of a predetermined time t1 that starts at the falling edge of the third clock pulse CP (#3), the blue LED of the exposure lamp 46 turns on for the predetermined light-up time period T. Upon the lighting-up of the blue LED, electric charge whose amount is approximately in accordance with the amount of the blue light received during the turn-on time period T is accumulated in each of photodiode devices 80 of the image sensor 50. Each of the accumulated electric charge is taken out of the corresponding one of the photodiode devices 80 into the electric charge transfer unit 82 when all of the gates 84 are opened concurrently in synchronization with the rising edge of the first clock pulse CP (#1), which is outputted in synchronization with the next detection signal EP outputted from the encoder 90. After a lapse of a predetermined time tt which starts from the falling edge of the clock pulse CP (#1) at which the gates 84 are closed, the electric charge transfer unit 82 starts the operation of transferring electric charge to the detection circuit 86. Thereafter, the transfer operation is ended when the detection circuit 86 has completed the detection of all electric charge. By this means, an analog signal for blue color component is outputted from the detection circuit 86 for each electric charge.

Through a set of operations described above, analog signals for three color components R, G, and B are outputted from the detection circuit 86, which constitute one pixel of an image scanned in the sub scan direction. The above series of operations constitutes one operation cycle. The operation cycle is iterated each time when the detection signal EP is outputted from the encoder 90. By this means, an image is scanned from an original document. Hereafter, the above mode of operation is referred to as the second control.

A Typical Problem Inherent in the Second Control, and the First Control that is Free from Such a Problem As a disadvantage of the second control, the quality of a scanned image could be degraded due to electric charge for the third blue color component in the cycle. That is, the actual accumulation amount of electric charge for the third blue color component could be larger than the amount of electric charge that is supposed to be accumulated for this color component during the predetermined light-up time period T.

The reason why such a problem occurs is that, when there is some variation in the moving speed of the carriage 40 in the sub scan direction, as illustrated in FIG. 12B, the time interval from the end of the light-up time period T for the third blue color component till the outputting of the detection signal EP from the encoder 90 is made longer than the ideal condition illustrated in FIG. 12A because of such a variation by the length of a delay time td. More specifically, the reason for the above is further explained as follows: it is possible that additional electric charge is still undesirably accumulated in the photodiode devices 80 due to the presence of a dark current, etc., even though the blue LED is not turned on after the end of the light-up time period T for the third blue color component; and if the timing of the detection signal EP outputted from the encoder 90 is delayed by the delay time td, unwanted extra electric charge could be accumulated for the blue light only, making the total actual accumulation amount larger than the supposed ideal accumulation amount. Such an additional electric charge accumulated for the blue color component has a direct and adverse effect on the precision of image data generated based on the accumulated electric charge, which results in degradation in the quality of the scanned image.

In order to address the above problem of possible degradation in image quality, the image reading apparatus 10 is configured such that, in addition to the above second control, the following first control is also available.

Figure 12C:
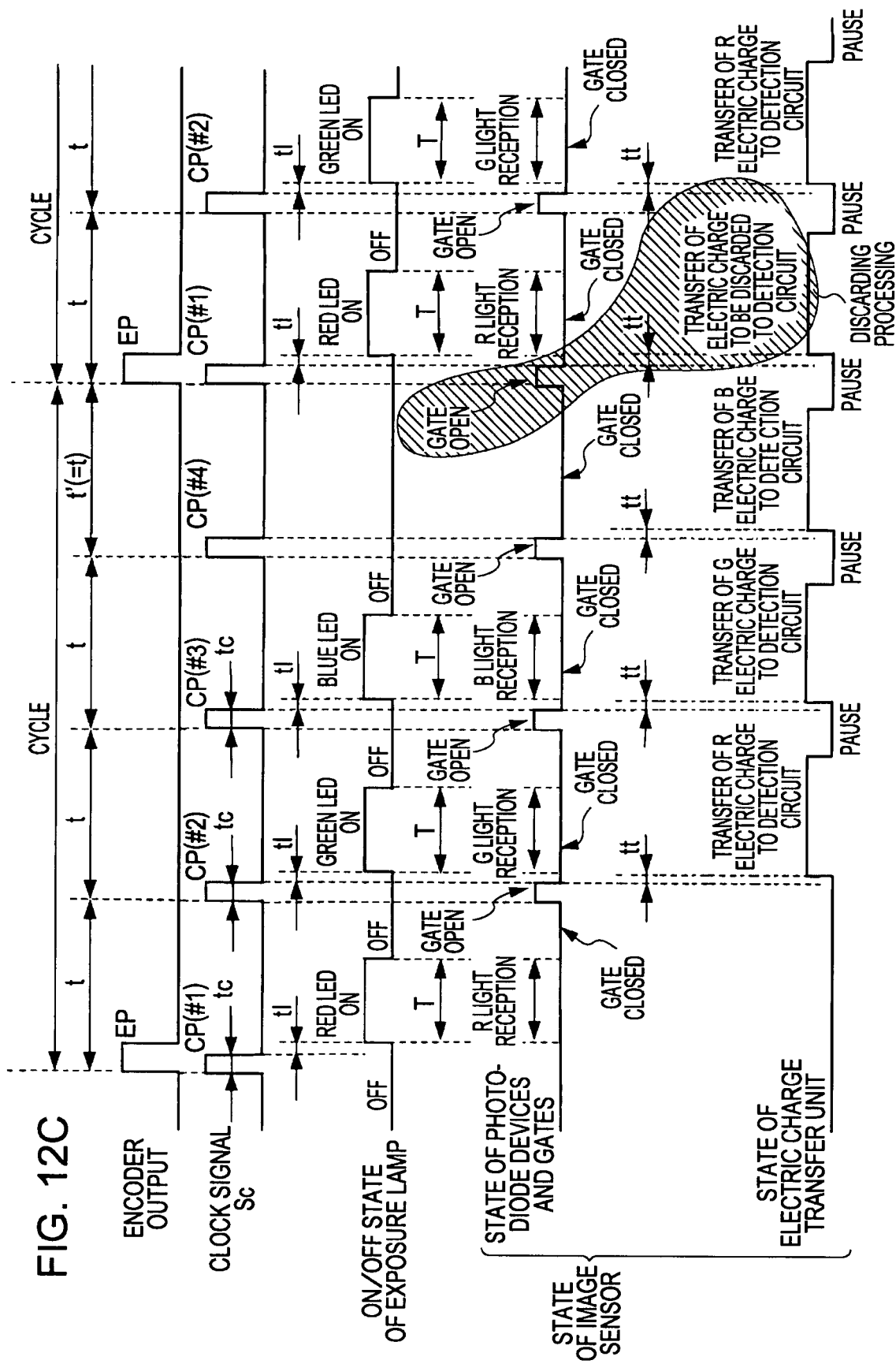
FIG. 12C is an operation timing chart that explains, as an example, the timing of the light emission operation of the exposure lamp 46, the open/close operation of the gates 84 of the image sensor 50, and so on, that are executed under the first control.

FIG. 12C is an operation timing chart that explains, as an example, the timing of the light emission operation of the exposure lamp 46, the open/close operation of the gates 84 of the image sensor 50, and so on, that are executed under the first control. Herein, the major difference between the first control and the second control lies in that, in contrast to the second control where three of clock pulses are outputted for each output of the detection signal EP from the encoder 90, four clock pulses, that is, the first clock pulse CP (#1), the second clock pulse CP (#2), the third clock pulse CP (#3), and the fourth clock pulse CP (#4), are outputted at intervals of the predetermined time t in the first control, and in addition thereto, a discarding processing is performed in the first control so as to discard any unwanted additional electric charge accumulated due to the presence of a dark current and so on after the electric charge discharge operation for the third blue color component (the open/close operation of the gates 84) that is performed at the timing of the fourth clock pulse CP (#4).

More specifically, as illustrated in FIG. 12C, just in the same manner as done in the second control, the first control works as follows: the LED light-up operation for the red color component is performed based on the first clock pulse CP (#1); the discharge operation for taking out electric charge accumulated for the red color component to the electric charge transfer unit 82, the transfer operation for transferring the electric charge of the red color component to the detection circuit 86, and the LED light-up operation for the green color component is performed based on the second clock pulse CP (#2); and the discharge operation for taking out electric charge accumulated for the green color component to the electric charge transfer unit 82, the transfer operation for transferring the electric charge of the green color component to the detection circuit 86, and the LED light-up operation for the blue color component is performed based on the third clock pulse CP (#3). After having received the light of the third blue color component for the light-up time period T, the photodiode devices 80 hold electric charge accumulated therein, the amount of which approximately depends on the amount of the blue light received during the light-up time period T. The same explanation as made for the aforementioned second control does also hold true for the first control so far.

However, unlike the second control, the electric charge accumulated in each of the photodiode devices 80 for the third blue color component according to the first control is taken out of each of the photodiode devices 80 into the electric charge transfer unit 82 not at the timing of the next detection signal EP outputted from the encoder 90 but based on the fourth clock pulse CP (#4). That is, the gates 84 are opened at the rising edge of the fourth clock pulse CP (#4). After a lapse of a predetermined time tt which starts from the falling edge of the clock pulse CP (#4) at which the gates 84 are closed, the electric charge transfer unit 82 starts the operation of transferring electric charge to the detection circuit 86. Thereafter, the transfer operation is ended when the detection circuit 86 has completed the detection of all electric charge.

Then, at the first clock pulse CP (#1) that is outputted in synchronization with the rising edge of the next detection signal EP, the electric charge to be discarded is taken out of the photodiode devices 80 through the opening and then closing operation of the gates 84. That is, through the electric discharge operation executed at the output timing of the next detection signal EP, any unwanted additional electric charge, which is accumulated in the photodiode devices 80 due to the presence of a dark current and so on after the electric charge discharge operation for the third blue color component (i.e. after the closing operation of the gates 84 at the falling edge of the clock pulse CP (#4)) but before the outputting of the next detection signal EP, is discarded. Therefore, even if there occurs a delay in the output of the detection signal EP, which poses a problem in the second control, it is possible to avoid or reduce degradation in the image quality due to any unwanted additional electric charge, which is achieved by the discarding processing described above.

However, the first control has a disadvantage in that its scanning speed is slower than that of the second control because the former takes extra time for the discarding of electric charge. That is, as a comparison between FIG. 12A and FIG. 12C shows clearly, the first control illustrated in FIG. 12C requires extra time for scanning than the second control illustrated in FIG. 12A does by the length of an additional predetermined time t taken for generation of the fourth clock pulse CP (#4).

In order to address such a problem, the image reading apparatus 10 is configured to select either one of the first control and the second control depending on the conditions imposed at the time of scanning so as to perform image reading as explained below.

It should be noted that, in FIG. 12C, the reason why a time interval between the rising edge of the fourth clock pulse CP (#4) in a certain cycle and the first clock pulse CP (#1) in the next cycle is denoted as t', rather than t, is that, as has already been explained when discussing the second control, the output timing of the first clock pulse CP (#1) is subjected to variation depending on a possible delay in the outputting of the detection signal EP. Thus, if it is assumed that there is not any delay in the outputting of the detection signal EP, which is an ideal condition, the above time interval t' is equal to the predetermined time t, where the figure illustrates such an ideal condition.

Conditions Taken Into Consideration for Making Selection Between the First Control and the Second Control As for the selection between the first control and the second control for image scanning, the controller 60 makes a judgment prior to execution of image scanning based on the following conditions. The controller 60 sends the result of selection to the clock signal generation unit 110. The clock signal generation unit 110 generates a clock signal Sc having the number of clock pulses corresponding to the selection result for control.

(1) Reading Resolution in Sub Scan Direction

Generally speaking, a higher importance is placed on the quality of an image when the reading resolution is high whereas it is placed on the processing speed of scanning when the reading resolution is low. Accordingly, if it is possible to set two patterns of reading resolution in the sub scan direction, that is, either a first resolution or a second resolution, which is lower than the first resolution, the controller 60 may make a selection between the first control and the second control on the basis of the reading resolution in accordance with the following criterion.

Figure 13:
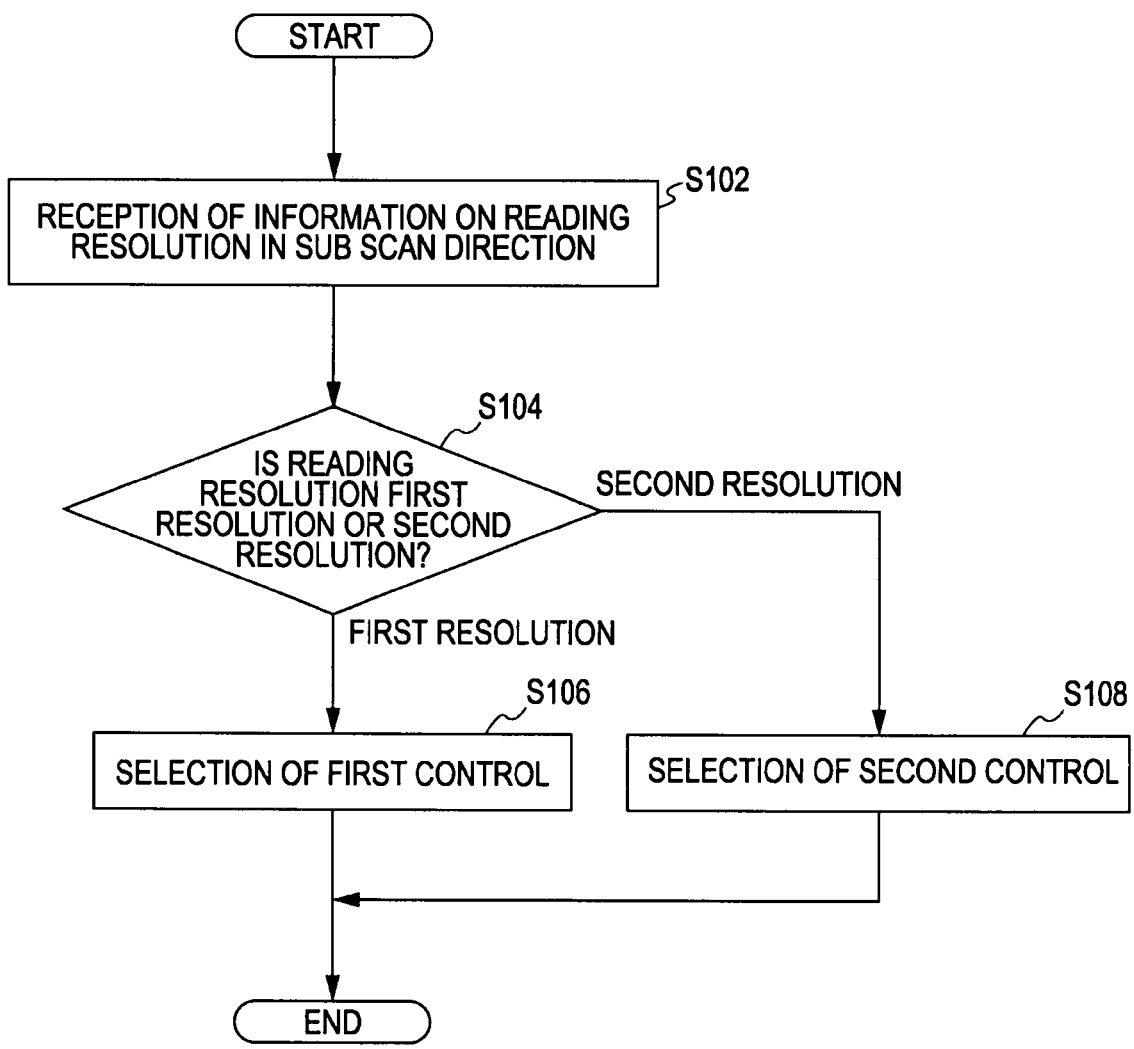
FIG. 13 is a flowchart that illustrates procedures for selecting either one of the first control and the second control on the basis of reading resolution in the sub scan direction.

As shown in the flowchart of FIG. 13, if scan command signal information transmitted from the computer apparatus 20 to the controller 60 in the step S102 indicates that the reading resolution in the sub scan direction is the first resolution the controller 60 selects the first control (S104, S106), whereas it selects the second control if information indicates that the reading resolution in the sub scan direction is the second resolution (S104, S108).

Incidentally, the aforementioned time t, which defines the output cycle of the clock pulses CP, is a fixed value that is predominantly determined by the transfer speed capability of the electric charge transfer unit 82 and so on. Therefore, it is normally difficult to change this value. For this reason, the set target value of the moving speed of the carriage 40 is adjusted as a predominant measure for ensuring that three or four clock pulses are outputted between adjacent signals EP, which are outputted at each move of the carriage 40 having the vector amount of movement that corresponds to one pixel.

More specifically, when the first control is selected, the target value V1a of the moving speed of the carriage 40 is set at a value calculated from the following mathematical expression 1 shown below, in which "D1" denotes the size of a pixel in the sub scan direction that corresponds to the first resolution (the vector amount of the move of the carriage 40).

$$V1a = D1/(4 \times t)$$ Mathematical Expression 1

According to the target value V1a, in the first control, it is possible to ensure that four clock pulses CP are outputted in each cycle.

On the other hand, when the second control is selected, the target value V2a of the moving speed of the carriage 40 is set at a value calculated from the following mathematical expression 2 shown below, in which "D2" denotes the size of a pixel in the sub scan direction that corresponds to the second resolution.

$$V2a = D1/(3 \times t) \qquad \text{Mathematical Expression 2}$$

According to the target value V2a, in the second control, it is possible to ensure that three clock pulses CP are outputted in each cycle.

(2) Target Value of Moving Speed of Carriage 40

Generally speaking, when the target item that is to be controlled is a speed, as the speed becomes lower, the overall performance of control, or controllability, tends to become poor due to mechanical resistance such as a friction, etc., that occurs when the target object is moved. This also holds true when the carriage 40 is moved at a constant moving speed of a predetermined target value; that is, the controllability of feedback control tends to decrease as the target value of the moving speed becomes lower. That is, the lower the target value, the larger the amount of variation in the moving speed, which lengthens a delay in the outputting of the detection signal EP from the encoder 90, resulting in an increased possibility of degradation in image quality due to the presence of a dark current, etc.

Accordingly, if it is possible to set two patterns of target moving speed of the carriage 40, that is, either a first speed V1b or a second speed V2b, which is higher than the first speed V1b, the controller 60 may make selection between the first control and the second control on the basis of the target value of the moving speed V1b or V2b in accordance with the following judgment criterion.

Figure 14:
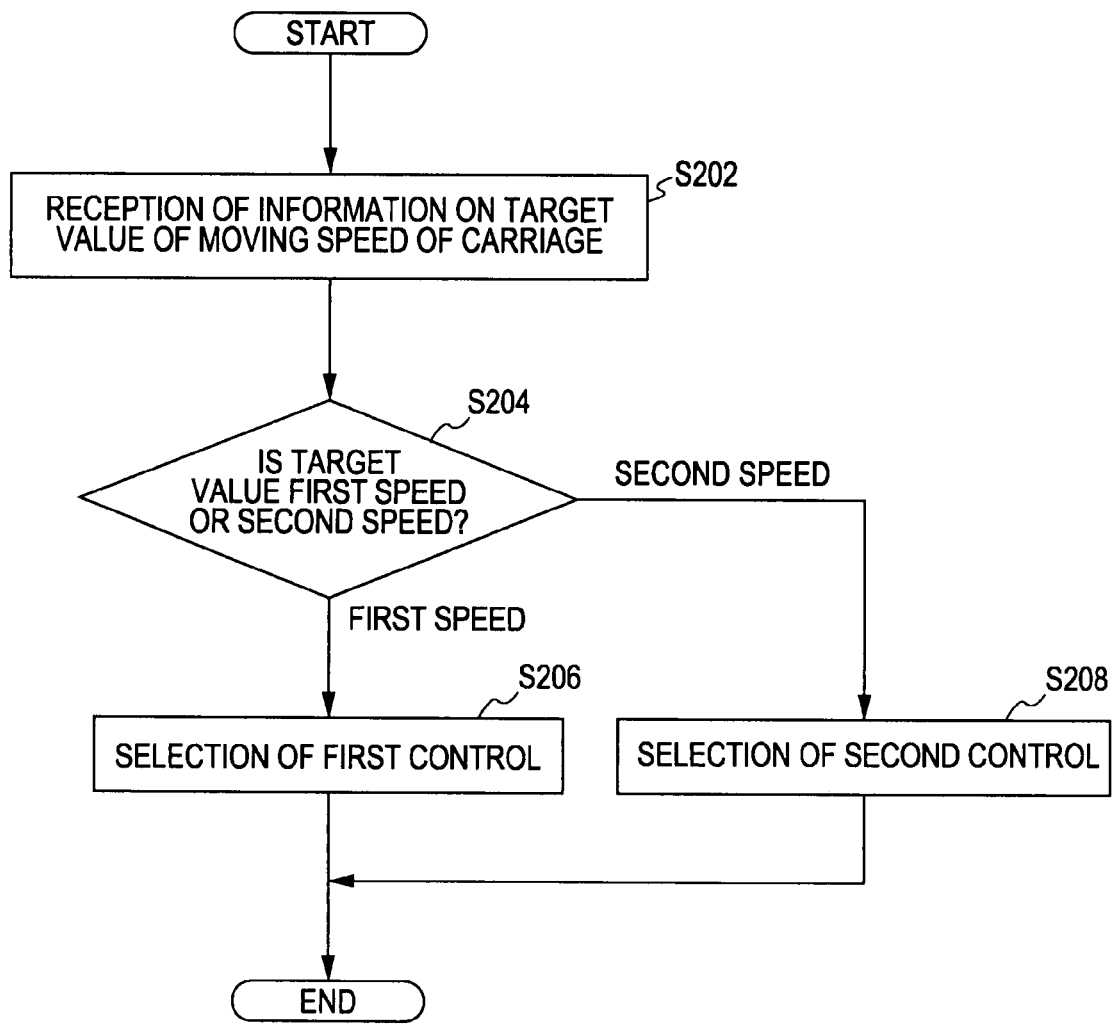
FIG. 14 is a flowchart that illustrates procedures for selecting either one of the first control and the second control on the basis of the target value of the moving speed of the carriage 40.

More specifically, as shown in the flowchart of FIG. 14, if scan command signal information transmitted from the computer apparatus 20 to the controller 60 in the step S202 indicates that the target moving speed of the carriage 40 is the first speed V1b, the controller 60 selects the first control (S204, S206), whereas it selects the second control if information indicating that the target moving speed of the carriage 40 is the second speed V2b (S204, S208).

In the above criterion, the predetermined time t is calculated on the basis of the target value of the moving speed V1b or V2b as follows. That is, the predetermined time t for the first control is set at a value calculated from the following mathematical expression 3, whereas the predetermined time t for the second control is set at a value calculated from the following mathematical expression 4.

$$t = D/(V1b \times 4) \qquad \text{Mathematical Expression 3}$$

$$t = D/(V2b \times 3) \qquad \text{Mathematical Expression 4}$$

It should be noted that "D" in the above mathematical expressions 3 and 4 denotes the size of a pixel in the sub scan direction that corresponds to the reading resolution. In addition, the reason why "4" is included in the denominator of the above Mathematical Expression 3 and "3" is included in the denominator of the above Mathematical Expression 4 is that it is necessary to generate four clock pulses CP in each cycle for the first control, whereas it is necessary to generate three clock pulses CP in each cycle for the second control.

(3) Variation in Moving Speed of Carriage 40

Generally speaking, the larger the amount of variation (i.e. the amount of scatter, dispersion) in the moving speed of the carriage 40, the longer the delay in the outputting of the detection signal EP from the encoder 90. This results in an increased possibility of degradation in image quality due to the presence of a dark current, etc. Accordingly, the selection between the first control and the second control may be made based on the amount of variation in the moving speed in accordance with the following judgment criterion.

Figure 15:
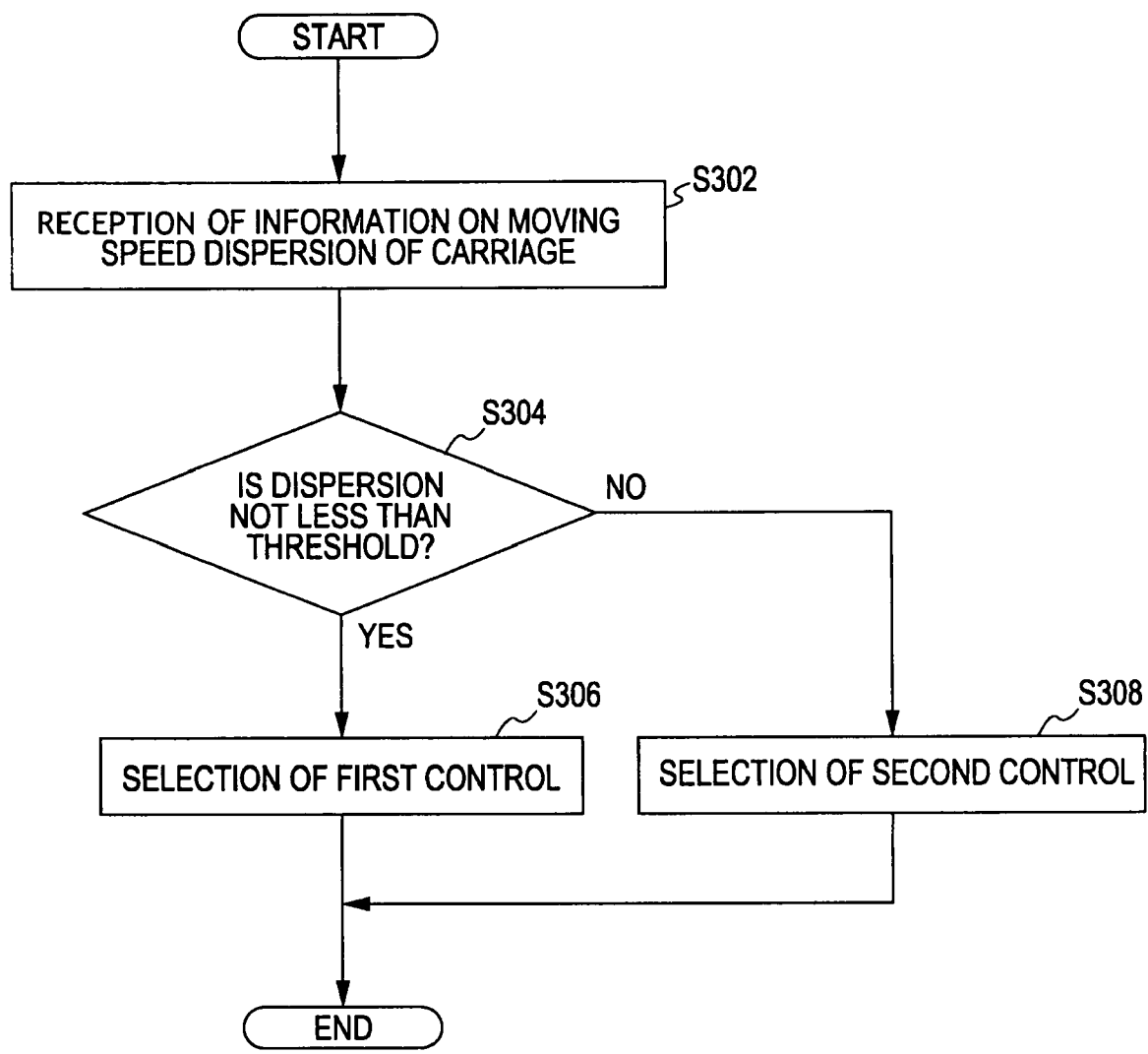
FIG. 15 is a flowchart that illustrates procedures for selecting either one of the first control and the second control on the basis of the amount of variation (i.e. the amount of scatter, dispersion) in the moving speed of the carriage 40.
Figure 17A:
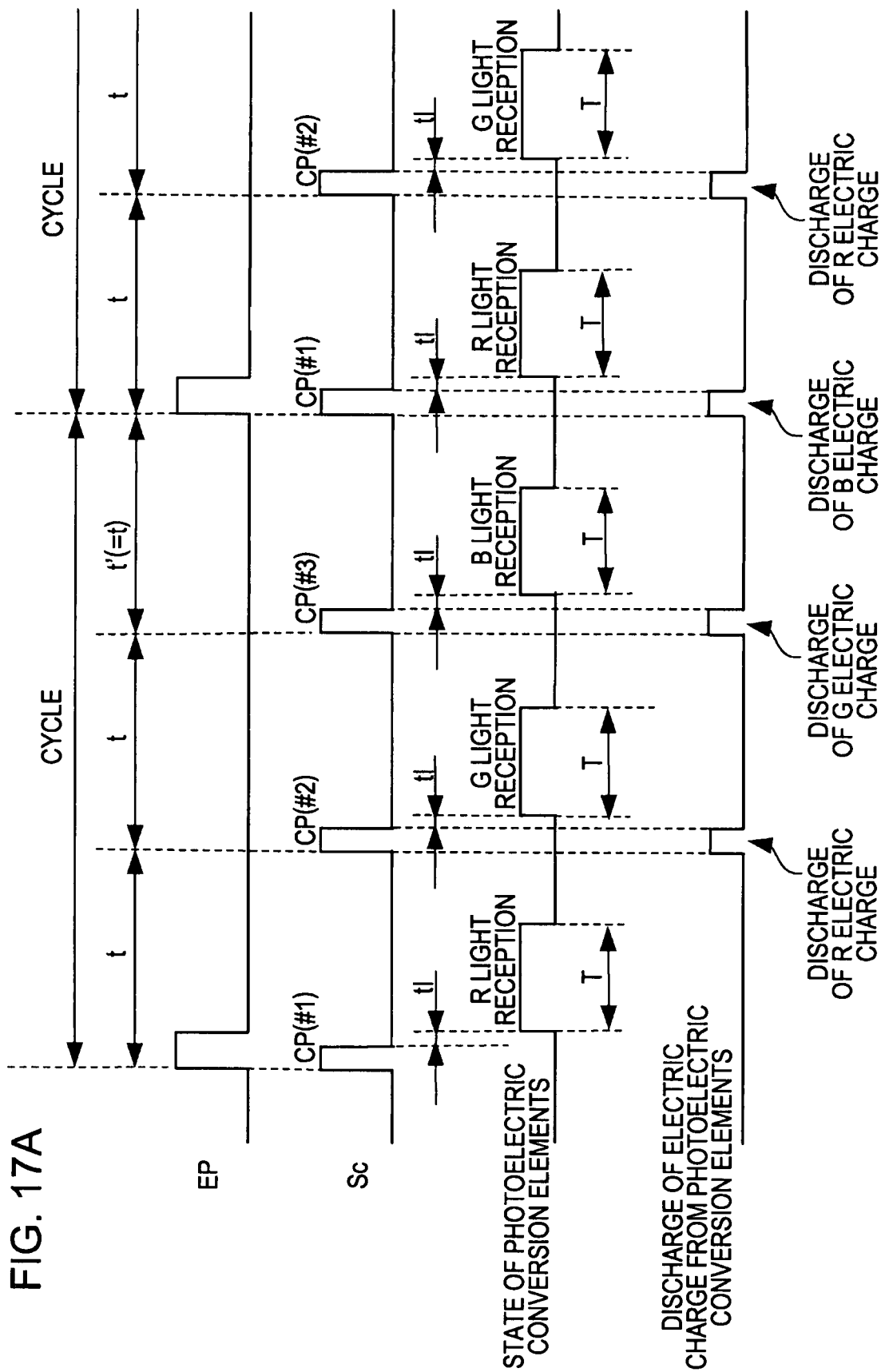
FIG. 17A is an explanatory diagram that schematically illustrates an example of the operation timing of the light reception operation and the electric charge discharge operation when the second control is adopted.

More specifically, as shown in the flowchart of FIG. 15, the controller 60 selects the first control if moving speed variation information affixed to a scan command signal, which is transmitted from the computer apparatus 20 to the controller 60 in the step S302, is not less than a threshold value (S304, S306), whereas the controller 60 selects the second control if it is less than the threshold value (S304, S308).

It should be noted that the amount of variation in the moving speed of the carriage 40 is subjected to periodic check. At each execution of check, the amount of variation in movement speed is updated in the memory of the computer apparatus 20.

The amount of variation in the moving speed is calculated on the basis of, for example, velocity error ΔV between the actual moving speed value Vr and the target moving speed value Vc when the carriage 40 is moved at a moving speed of a predetermined target value Vc.

Herein, the actual moving speed value Vr is calculated on the basis of the output cycle of the detection signal EP of the encoder 90. That is, since the motion vector amount L for which the detection signal EP is outputted is known, it is possible to calculate the actual value Vr of the moving speed from the Mathematical Expression 5 by measuring the time interval X at which the detection signal EP of the encoder 90 is outputted.

$$Vr = L/X \qquad \text{Mathematical Expression 5}$$

After calculating a predetermined sample number of velocity errors ΔV from the Mathematical Expression 5, a momentary speed variation is calculated by dividing the maximum value ΔVmax among the calculated samples of velocity errors ΔV or the average value ΔVave thereof by the target value Vc. This momentary speed variation represents the amount of variation in the moving speed described above.

(4) Input from Manipulation Panel 18

As an example of alternative embodiment, the manipulation panel 18 illustrated in FIG. 1 may be provided with selection buttons for making selection between the first control and the second control. With such a configuration, user is thereby allowed to enter their selection result.

More specifically, as shown in the flowchart of FIG. 16, the controller 60 selects the first control if information on the selection result, which is transmitted from the manipulation panel 18 to the controller 60 in the step S402, indicates the selection of the first control (S404, S406), whereas the controller 60 selects the second control if it indicates the second control (S404, S408). With such a configuration, it is possible for user to freely select and execute either one of the first control and the second control depending on the requirements of each situation, which enhances user-friendliness.

Other Embodiments

As described above, although the present invention is explained while discussing an exemplary embodiment of the invention, the specific embodiment described above is provided solely for the purpose of facilitating the understanding of the invention. It should be noted that, in no case, the above explanatory embodiment is interpreted to limit the scope of the invention. The invention may be modified, altered, adapted, or improved without departing from the spirit thereof; and in addition, it goes without saying that the scope of the invention encompasses various equivalents even though they are not explicitly described herein. In particular, it is intended that the following specific variation of the embodiment is also within the scope of the invention.

Relative Move: Photoelectric Conversion Elements 80 and Original Document 15 in Sub Scan Direction According to the embodiment of the invention described above, with the original document 15 being placed at a fixed position on the original document table glass 12, the photoelectric conversion elements 80 of the carriage 40 are moved with respect to the original document 15 in the sub scan direction. However, the invention is not intended to be limited to such a specific embodiment In an alternative embodiment, the photoelectric conversion elements 80 may be fixed at a predetermined position in the sub scan direction of the image reading apparatus 10, whereas the original document 15 may be moved in the sub scan direction with respect to the fixed photoelectric conversion elements 80 by an automatic original document feeder or other similar mechanism.

Separation of Light Coming From Original Document 15 into Red, Green, and Blue for Reception by Photoelectric Conversion Elements 80

According to the embodiment of the invention described above, the exposure lamp 46, which functions as a light source, is provided with a red LED, a green LED, and a blue LED. Each of a red light, a green light, and a blue light is emitted separately from other two color components at the light source side for subsequent reception by the photoelectric conversion elements 80. However, the invention is not intended to be limited to such a specific embodiment. For example, in another embodiment, a white light source may be used, and each of the photoelectric conversion elements 80 may be provided with three types of filters, that is, a red-only filter that transmits a red color component only, a green-only filter that transmits a green color component only, and a blue-only filter that transmits a blue color component only, where these three types of filters are switched over therebetween each time when the white light source described above is turned on so as to allow reception of a light by the photoelectric conversion elements 80.

What is claimed is:

1. An image reading apparatus that scans an image from an original document, comprising:
   a light source that irradiates a light to the original document;
   a photoelectric conversion element that selectively receives a red color component, a green color component, and a blue color component of a light which is reflected from or transmitted through the original document so as to accumulate electric charge, the amount of which depends on the amount of the light received;
   a driving mechanism that moves either one of the photoelectric conversion element or the original document in a predetermined direction with respect to the other;
   a detection sensor that detects a vector amount of movement of either one of the photoelectric conversion element or the original document in the predetermined direction with respect to the other so as to output a detection signal for each vector amount of movement that corresponds to a minimum unit of a reading area of the image; and
   a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration,
   wherein the control section selects and executes either one of a first control and a second control based on a predetermined condition information, where, in the first control, the electric charge of the photoelectric conversion element is discarded during a time period in each cycle after the electric charge discharge operation for the last color component but before the outputting of the detection signal, whereas such a discarding operation is not executed in the second control.

2. The image reading apparatus according to claim 1, wherein the predetermined condition information is information on reading resolution that defines the minimum unit of the reading area of the image, and the control section selects the first control when the reading resolution is a first resolution, and the control section selects the second control when the reading resolution is a second resolution, the second resolution being lower than the first resolution.

3. The image reading apparatus according to claim 1, wherein the predetermined condition information is information on a moving speed target value at which either one of the photoelectric conversion element or the original document is moved with respect to the other, the moving speed target value is constant from the start of scanning of the image through the end of scanning of the image, and the control section selects the first control when the target value is a first speed, and the control section selects the second control when the target value is a second speed, the second speed being higher than the first speed.

4. The image reading apparatus according to claim 1, wherein the predetermined condition information is information on an amount of variation in moving speed at which either one of the photoelectric conversion element or the original document is moved with respect to the other, and the control section selects the first control when the amount of variation in moving speed is greater than or equal to a threshold value, and the control section selects the second control when the amount of variation in moving speed is less than the threshold value.

5. The image reading apparatus according to claim 1, further comprising an input section that allows user to input selection information, wherein the predetermined condition information is said selection information that indicates which one of the first control or the second control is selected.

6. The image reading apparatus according to claim 1, wherein the light source further comprises a red light emitting diode that emits a light of red color component, a green light emitting diode that emits a light of green color component, and a blue light emitting diode that emits a light of blue color component, and, in each cycle of operations, the control section turns on each light emitting diode once for each color at the predetermined time interval in the predetermined color order and turns off each light emitting diode after a lapse of the light reception time duration from the light-up, and takes electric charge out of the photoelectric conversion element after each light emitting diode has been turned off but before the light emitting diode of the next color is turned on.

7. The image reading apparatus according to claim 6, wherein the control section has a clock pulse generation section that outputs, in each of the cycles, clock pulses at the predetermined time interval, where the point in time the detection signal is outputted is used as a starting point of the initial clock pulse is outputted, such that the initial clock pulse is synchronized with the outputting of the detection signal; and when the first control is selected, the control section turns on the light emitting diode in the predetermined color order based on a clock pulse outputted from the clock pulse generation section, and takes electric charge out of the photoelectric conversion element based on a clock pulse subsequent to the previous clock pulse, which was used for triggering the light-up; and electric charge that is accumulated in the photoelectric conversion element during a time period in the cycle after the electric charge discharge operation for the last color component but before the outputting of the detection signal is discarded based on the outputting of the detection signal.

8. The image reading apparatus according to claim 6, wherein when the second control is selected the control section turns on the light emitting diode in the predetermined color order based on a clock pulse, and takes electric charge out of the photoelectric conversion element based on a clock pulse subsequent to the previous clock pulse, which was used for triggering the light-up; and as for the last color component in the cycle, electric charge of the last color component is taken out of the photoelectric conversion element based on the outputting of the detection signal.

9. The image reading apparatus according to claim 8, further comprising:
   an output cycle value of the clock pulse,
   wherein the second control is selected and a value D denotes the vector amount of movement that corresponds to the minimum unit of the reading area of the image and and a value V denotes the moving speed target value at which either one of the photoelectric conversion element or the original document is moved with respect to the other, and the output cycle of the clock pulse equals $(D/V)/3$.

10. An image reading method for scanning an image from an original document, comprising the steps of:
   irradiating a light from a light source to the original document;
   selectively receiving a red color component, a green color component, and a blue color component of a light which is reflected from or transmitted through the original document so as to accumulate electric charge in a photoelectric conversion element, the amount of the electric charge being dependent on the amount of the light received;
   relatively moving either one of the photoelectric conversion element and the original document in a predetermined direction with respect to the other;
   detecting a vector amount of a relative move of either one of the photoelectric conversion element and the original document in the predetermined direction with respect to the other by a detection sensor so as to output a detection signal for each relative motion vector amount that corresponds to a minimum unit of a reading area of the image therefrom; and
   executing, by a control section, one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration,
   wherein the control section selects and executes either one of a first control and a second control based on a predetermined condition information, where, in the first control, the electric charge of the photoelectric conversion element is discarded during a time period in each cycle after the electric charge discharge operation for the last color component but before the outputting of the detection signal, whereas such a discarding operation is not executed in the second control.

11. An image reading system that includes a computer and an image reading apparatus that scans an image from an original document, the image reading apparatus being connected to the computer so as to allow communication therebetween, the image reading apparatus comprising:
   a light source that irradiates a light to the original document;
   a photoelectric conversion element that selectively receives a red color component, a green color component, and a blue color component of a light which is reflected from or transmitted through the original document so as to accumulate electric charge, the amount of which depends on the amount of the light received;
   a driving mechanism that relatively moves either one of the photoelectric conversion element and the original document in a predetermined direction with respect to the other;
   a detection sensor that detects a vector amount of a relative move of either one of the photoelectric conversion element and the original document in the predetermined direction with respect to the other so as to output a detection signal for each relative motion vector amount that corresponds to a minimum unit of a reading area of the image; and
   a control section that executes one cycle of operations each time when the detection signal is outputted from the detection sensor, where said one cycle of operations consists of a light reception operation in which the photoelectric conversion element receives a light of each color component in a predetermined color order for a predetermined light reception time duration at a predetermined time interval in such a manner that the light reception operation is executed once for each color component, and an electric charge discharge operation in which electric charge is taken out of the photoelectric conversion element after each light reception operation executed for the predetermined light reception time duration,
   wherein the control section selects and executes either one of a first control and a second control based on a predetermined condition information, where, in the first control, the electric charge of the photoelectric conversion element is discarded during a time period in each cycle after the electric charge discharge operation for the last color component but before the outputting of the detection signal, whereas such a discarding operation is not executed in the second control.

12. The image reading apparatus according to claim 7, further comprising:
   an output cycle value of the clock pulse, wherein the first control is selected and a value D denotes the vector amount of movement that corresponds to the minimum unit of the reading area of the image and a value V denotes the moving speed target value at which either one of the photoelectric conversion element or the original document is moved with respect to the other, and the output cycle of the clock pulse equals (D/V)/4.

13. The image reading apparatus in claim 1, further comprising:

a carriage; and an original document table, wherein the original document is placed on the original document table and the carriage is moved by the driving mechanism, and the light source and the photoelectric conversion element are provided in the carriage.

14. The image reading apparatus in claim 1, further comprising:

a plurality of photoelectric conversion elements, wherein each of the photoelectric conversion elements is oriented orthogonally to the predetermined direction of movement.

15. The image reading apparatus in claim 1, further comprising:

an original document feeder, wherein the original document feeder moves the original document in the predetermined direction with respect to the photoelectric conversion element.

* * * * *